United States Patent
Zhu et al.

(10) Patent No.: US 8,917,743 B2
(45) Date of Patent: *Dec. 23, 2014

(54) METHOD AND SYSTEM FOR ENHANCED CONTENTION AVOIDANCE IN MULTI-USER MULTIPLE-INPUT-MULTIPLE-OUTPUT WIRELESS NETWORKS

(75) Inventors: Chunhui Zhu, San Jose, CA (US); Osama Aboul-Magd, Kanata (CA); Youngsoo Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 346 days.

This patent is subject to a terminal disclaimer.

(21) Appl. No.: 13/253,926

(22) Filed: Oct. 5, 2011

(65) Prior Publication Data

US 2012/0087358 A1 Apr. 12, 2012

Related U.S. Application Data

(60) Provisional application No. 61/390,559, filed on Oct. 6, 2010.

(51) Int. Cl.
| | |
|---|---|
| *H04L 12/413* | (2006.01) |
| *H04W 72/04* | (2009.01) |
| *H04W 74/08* | (2009.01) |
| *H04L 12/43* | (2006.01) |
| *H04W 74/00* | (2009.01) |
| *H04W 72/00* | (2009.01) |

(52) U.S. Cl.
CPC ........ *H04W 72/042* (2013.01); *H04W 74/0816* (2013.01); *H04W 74/006* (2013.01); *H04W 72/005* (2013.01); *H04W 72/0413* (2013.01)
USPC ........... 370/447; 370/445; 370/458; 370/461; 370/462

(58) Field of Classification Search
CPC ................... H04W 74/0816; H04W 72/0413; H04W 74/006; H04W 72/005; H04W 72/042
USPC .......................... 370/445, 447, 458, 461, 462
See application file for complete search history.

(56) References Cited

U.S. PATENT DOCUMENTS

| | | |
|---|---|---|
| 5,615,212 A | 3/1997 | Ruszczyk et al. |
| 5,886,993 A | 3/1999 | Ruszczyk et al. |

(Continued)

OTHER PUBLICATIONS

U.S. Non-Final Office Action mailed Jul. 11, 2013 for U.S. Appl. No. 12/455,438.

(Continued)

*Primary Examiner* — Omer S Mian
(74) *Attorney, Agent, or Firm* — Kenneth L. Sherman, Esq.; Michael Zarrabian, Esq.; Sherman & Zarrabian LLP

(57) ABSTRACT

Wireless medium reservation for simultaneous transmission of multiple downlink spatial streams to multiple receiver wireless stations during a multi-user transmit opportunity over a wireless medium, is provided. Such a reservation includes reserving a transmission period for simultaneously transmitting data from a transmitting station to multiple intended receiving stations on multiple downlink spatial streams over a wireless communication medium. Reserving the transmission period includes transmitting a multi-user request-to-send (MU-RTS) frame to the multiple receiving stations, the RTS frame including a receiver address (RA) field comprising compressed addresses for the multiple receiving stations. The MU-RTS frame includes an indication field that indicates the RTS frame as an MU-RTS without altering the RTS frame type/subtype.

33 Claims, 19 Drawing Sheets

(56) References Cited

U.S. PATENT DOCUMENTS

| | | |
|---|---|---|
| 6,198,728 B1 | 3/2001 | Hulyalkar et al. |
| 6,795,421 B1 | 9/2004 | Heinonen et al. |
| 6,807,158 B2 | 10/2004 | Krishnamurthy et al. |
| 6,813,277 B2 | 11/2004 | Edmon et al. |
| 6,868,072 B1 | 3/2005 | Lin et al. |
| 6,925,064 B2 | 8/2005 | Hester et al. |
| 7,079,812 B2 | 7/2006 | Miller et al. |
| 7,088,702 B2 | 8/2006 | Shvodian |
| 7,127,254 B2 | 10/2006 | Shvodian et al. |
| 7,184,767 B2 | 2/2007 | Gandolfo |
| 7,197,025 B2 | 3/2007 | Chuah |
| 7,251,235 B2 | 7/2007 | Wentink |
| 7,280,518 B2 | 10/2007 | Montano et al. |
| 7,280,801 B2 | 10/2007 | Dahl |
| 7,339,916 B2 | 3/2008 | Kwon et al. |
| 7,356,341 B2 | 4/2008 | Nanda |
| 7,359,398 B2 | 4/2008 | Sugaya |
| 7,385,943 B2 | 6/2008 | Niddam |
| 7,388,833 B2 | 6/2008 | Yuan et al. |
| 7,400,899 B2 | 7/2008 | Shin et al. |
| 7,447,174 B2 | 11/2008 | Joshi |
| 7,447,180 B2 | 11/2008 | Jeong et al. |
| 7,474,686 B2 | 1/2009 | Ho |
| 7,480,266 B2 | 1/2009 | Murty et al. |
| 7,486,650 B2 | 2/2009 | Trainin |
| 7,539,930 B2 | 5/2009 | Ginzburg et al. |
| 7,545,771 B2 | 6/2009 | Wentink et al. |
| 7,561,510 B2 | 7/2009 | Imamura et al. |
| 7,570,656 B2 | 8/2009 | Raphaeli et al. |
| 7,590,078 B2 | 9/2009 | Nanda |
| 7,623,542 B2 | 11/2009 | Yonge et al. |
| 7,634,275 B2 | 12/2009 | Odman |
| 7,664,030 B2 | 2/2010 | Sugaya |
| 7,664,132 B2 | 2/2010 | Benveniste |
| 7,680,150 B2 | 3/2010 | Liu et al. |
| 7,684,380 B2 | 3/2010 | Odman |
| 7,697,448 B2 | 4/2010 | Karaoguz |
| 7,787,487 B2 | 8/2010 | Liu |
| 7,804,804 B2 | 9/2010 | Sugaya et al. |
| 7,860,054 B2 | 12/2010 | Benveniste |
| 7,924,805 B2 | 4/2011 | Nishibayashi et al. |
| 7,944,897 B2 | 5/2011 | Shao et al. |
| 7,974,261 B2 | 7/2011 | Lane et al. |
| 8,068,449 B2 | 11/2011 | Benveniste |
| 8,072,961 B2 | 12/2011 | Takano |
| 8,107,424 B2 | 1/2012 | Li et al. |
| 8,179,867 B2 | 5/2012 | Seok |
| 8,194,626 B2 | 6/2012 | Moorti et al. |
| 2003/0003905 A1 | 1/2003 | Shvodian |
| 2003/0137970 A1 | 7/2003 | Odman |
| 2003/0137993 A1 | 7/2003 | Odman |
| 2003/0214967 A1 | 11/2003 | Heberling |
| 2004/0047319 A1 | 3/2004 | Elg |
| 2004/0214571 A1 | 10/2004 | Hong |
| 2004/0218683 A1 | 11/2004 | Batra et al. |
| 2004/0264475 A1 | 12/2004 | Kowalski |
| 2005/0058151 A1 | 3/2005 | Yeh |
| 2005/0130634 A1 | 6/2005 | Godfrey |
| 2005/0135318 A1 | 6/2005 | Walton et al. |
| 2005/0232275 A1 | 10/2005 | Stephens |
| 2006/0002428 A1 | 1/2006 | Trainin |
| 2006/0050742 A1 | 3/2006 | Grandhi et al. |
| 2006/0056362 A1* | 3/2006 | Jang et al. .................. 370/336 |
| 2006/0166683 A1 | 7/2006 | Sharma et al. |
| 2006/0176908 A1 | 8/2006 | Kwon et al. |
| 2006/0193279 A1 | 8/2006 | Gu et al. |
| 2007/0280180 A1 | 12/2007 | Dalmases et al. |
| 2008/0159208 A1 | 7/2008 | Kloker et al. |
| 2008/0279204 A1 | 11/2008 | Pratt, Jr. et al. |
| 2009/0052389 A1 | 2/2009 | Qin et al. |
| 2009/0086706 A1* | 4/2009 | Huang et al. .................. 370/349 |
| 2009/0092086 A1 | 4/2009 | Lee et al. |
| 2009/0103501 A1* | 4/2009 | Farrag et al. .................. 370/337 |
| 2009/0275292 A1 | 11/2009 | Chang |
| 2009/0285163 A1 | 11/2009 | Zhang et al. |
| 2009/0310619 A1* | 12/2009 | Brommer .................. 370/449 |
| 2009/0323611 A1 | 12/2009 | Singh et al. |
| 2010/0002639 A1 | 1/2010 | Qin et al. |
| 2010/0046453 A1 | 2/2010 | Jones, IV et al. |
| 2010/0046518 A1 | 2/2010 | Takagi et al. |
| 2010/0220601 A1 | 9/2010 | Vermani et al. |
| 2010/0310003 A1 | 12/2010 | Lauer et al. |
| 2011/0002319 A1 | 1/2011 | Husen et al. |
| 2011/0064013 A1 | 3/2011 | Liu et al. |
| 2011/0090855 A1* | 4/2011 | Kim .................. 370/329 |
| 2011/0176627 A1* | 7/2011 | Wu et al. .................. 375/260 |
| 2011/0194644 A1* | 8/2011 | Liu et al. .................. 375/295 |
| 2011/0235513 A1 | 9/2011 | Ali |
| 2011/0255618 A1 | 10/2011 | Zhu et al. |
| 2011/0317630 A1 | 12/2011 | Zhu et al. |
| 2012/0008490 A1 | 1/2012 | Zhu et al. |
| 2012/0082200 A1* | 4/2012 | Verikoukis et al. .................. 375/227 |
| 2012/0140615 A1 | 6/2012 | Gong |
| 2012/0218947 A1 | 8/2012 | Merlin et al. |
| 2012/0314694 A1 | 12/2012 | Hsieh |
| 2014/0010144 A1 | 1/2014 | Liu et al. |

OTHER PUBLICATIONS

U.S. Non-Final Office Action mailed Aug. 8, 2013 for U.S. Appl. No. 12/415,981.

U.S. Final Office Action mailed Dec. 19, 2012 for U.S. Appl. No. 12/415,981.

U.S. Advisory Action mailed Mar. 8, 2013 for U.S. Appl. No. 12/415,981.

U.S. Final Office Action mailed Jan. 14, 2014 for U.S. Appl. No. 12/415,981.

U.S. Non-Final Office Action for U.S. Appl. No. 13/177,386.

U.S. Notice of Allowance mailed Oct. 21, 2013 for U.S. Appl. No. 12/455,438.

U.S. Restriction Requirement for U.S. Appl. No. 13/030,070 mailed Nov. 5, 2013.

IEEE P802.11e/D13.0, "IEEE Standard for Information Technology—Telecommunications and Information Exchange Between Systems—Local and Metropolitan Area Networks—Specific Requirements: Part 11: Wireless LAN Medium Access Control (MAC) and Physical Layer (PHY) Specifications: Amendment: Medium Access Control (MAC) Quality of Service (QoS) Enhancements," LAN/MAN Committee, IEEE Computer Society, Jan. 2005, pp. i-182, IEEE, USA.

IEEE Wireless LAN Edition, "A Compilation Based on IEEE Std. 802.11TM-1999 (R2003) and Its Amendments," 2003, pp. i-678, IEEE Press, USA.

Mujtaba, S.A., "TGn Sync Proposal Technical Specification," IEEE 802.11-04-0889r7, IEEE P802.11: Wireless LANs, Jul. 8, 2005, pp. 1-133, IEEE, USA.

Kim, S. et al., "QoS Enhancement Scheme of EDCF in IEEE 802.11e Wireless LANs," Aug. 19, 2004, Electronics Letters, pp. 1091-1092, vol. 40, No. 17, IEEE, USA.

IEEE 802.11-2007, "IEEE Standard for Information Technology—Telecommunications and Information Exchange Between Systems—Local and Metropolitan Area Networks—Specific requirements: Part 11: Wireless LAN Medium Access Control (MAC) and Physical Leyer (PHY) Specifications", 2007 Revision of IEEE Std 802.11-1999, Jun. 12, 2007, pp. i-1184, IEEE Computer Society, USA.

International Search Report dated Jan. 9, 2009 for International Application No. PCT/KR2008/004793 from Korean Intellectual Property Office, filed Aug. 19, 2008, pp. 1-2, Seo-gu, Daejeon, Republic of Korea.

Harada, H., "Unified and Flexible Millimeter Wave WPAN Systems Supported by Common Mode," IEEE P802.15 Working Group for Wireless Personal Area Networks (WPANs), IEEE 802.15-07-0761-10-003c, Sep. 18, 2007, Slides 1-62, IEEE, USA.

Mirkovic, J. et al., "A MAC Protocol With Multi-User MIMO Supported for Ad-Hoc WLANs" Proceedings of the 18th Annual IEEE International Symposium on Personal, Indoor and Mobile Radio Communications (PIMRC '07), 2007, pp. 1-5, IEEE, USA.

(56) References Cited

OTHER PUBLICATIONS

Stacey, R. et al., "DL MU-MIMO Ack Protocol (IEEE 802.11-09/1172r0)", IEEE 802.11-09/1172r0, Nov. 16, 2009, pp. 1-8, IEEE, USA.
IEEE Computer Society, "IEEE Std 802®-2001 (R2007), IEEE Standard for Local and Metropolitan Area Networks: Overview and Architecture", Feb. 7, 2002, pp. i-36, IEEE, New York, USA.
Camp, J.D. et al., "The IEEE 802.11s Extended Service Set Mesh Networking Standard", IEEE Communications Magazine, Aug. 2008, pp. 1-6, vol. 46, No. 8, IEEE, USA.
Morioka, Y. et al., "Multi-RTS Proposal", IEEE 802.11-10/1124r01, Sep. 12, 2010, Slides 1-14, IEEE, USA.
U.S. Non-Final Office Action mailed Oct. 26, 2011 for U.S. Appl. No. 12/455,438.
U.S. Final Office Action mailed Apr. 12, 2012 for U.S. Appl. No. 12/455,438.
U.S. Non-Final Office Action mailed Jun. 6, 2012 for U.S. Appl. No. 12/415,981.
U.S. Non-Final Office Action mailed Jun. 9, 2009 for U.S. Appl. No. 11/589,519.
U.S. Final Office Action mailed May 12, 2010 for U.S. Appl. No. 11/589,519.
U.S. Notice of Allowance mailed Jan. 24, 2011 for U.S. Appl. No. 11/589, 519.
U.S. Non-Final Office Action mailed Jun. 27, 2006 for U.S. Appl. No. 11/044,600.
U.S. Non-Final Office Action mailed Aug. 21, 2007 for U.S. Appl. No. 11/044,600.
U.S. Final Office Action mailed Jan. 15, 2008 for U.S. Appl. No. 11/044,600.
U.S. Non-Final Office Action mailed Aug. 7, 2008 for U.S. Appl. No. 11/044,600.
U.S. Non-Final Office Action mailed Jan. 25, 2007 for U.S. Appl. No. 11/044,600.
U.S. Advisory Action mailed May 15, 2008 for U.S. Appl. No. 11/044,600.
U.S. Non-Final Office Action for U.S. Appl. No. 12/821,940 mailed May 29, 2012.
U.S. Final Office Action for U.S. Appl. No. 12/821,940 mailed Aug. 21, 2012.
U.S. Notice of Allowance mailed Apr. 10, 2014 for U.S. Appl. No. 12/415,981.
U.S. Non-Final Office Action for U.S. Appl. No. 12/821,940 mailed Jun. 24, 2014.
U.S. Non-Final Office Action for U.S. Appl. No. 13/030,070 mailed May 15, 2014.
U.S. Notice of Allowance for U.S. Appl. No. 12/821,940 mailed Oct. 31, 2014.

* cited by examiner

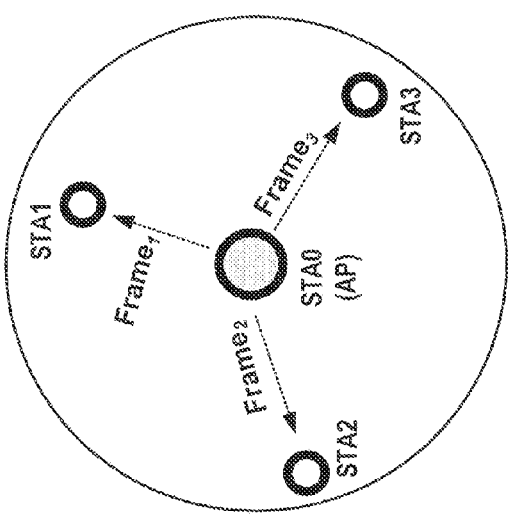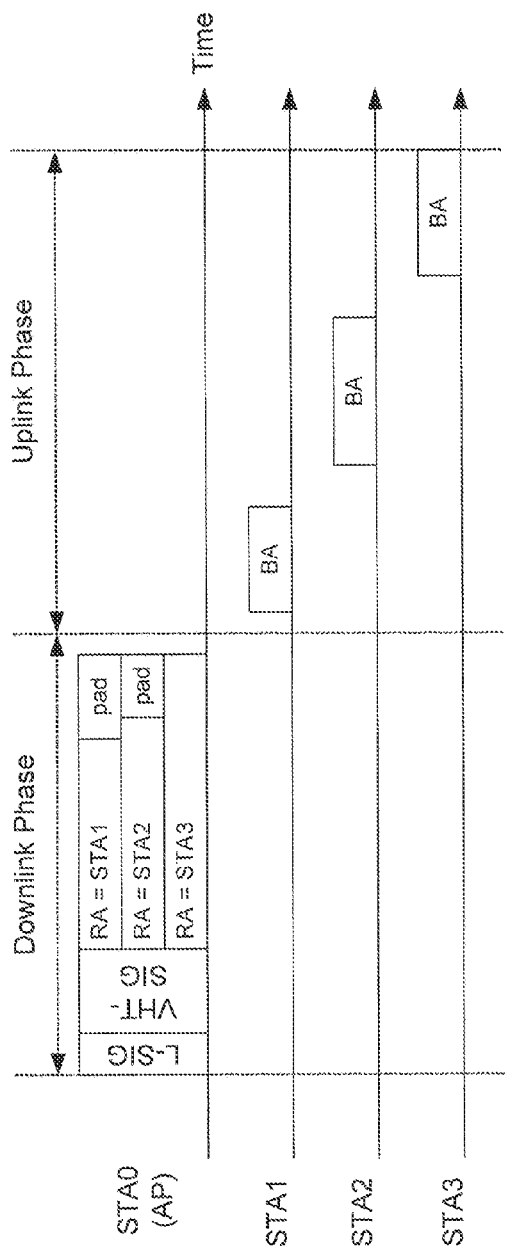

| Bits | Field | Description |
|---|---|---|
| B0-B6 | Scrambler Initialization | Set to the scrambler initialization bits in the TXVECTOR parameter SERVICE |
| B7 | Reserved | Set to the reserved bit in the TXVECTOR parameter SERVICE |
| B8-B15 | CRC | CRC calculated over VHT-SIG-B (excluding tail bits) |

FIG. 3C

| Rate (4 bits) | | | | Reserved | Length (12 bits) | | | | | | | | | | | | Parity | Tail (6 bits) | | | | | |
|---|---|---|---|---|---|---|---|---|---|---|---|---|---|---|---|---|---|---|---|---|---|---|---|
| R1 | R2 | R3 | R4 | | | | | | | | | | | | | | | | | | | | |
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |

METHOD AND SYSTEM FOR ENHANCED CONTENTION AVOIDANCE IN MULTI-USER MULTIPLE-INPUT-MULTIPLE-OUTPUT WIRELESS NETWORKS

RELATED APPLICATION

This application claims the benefit of U.S. Provisional Patent Application Ser. No. 61/390,559, filed on Oct. 6, 2010, incorporated herein by reference.

FIELD OF THE INVENTION

The present invention relates generally to wireless networks, and in particular, to wireless networks where multiple antennas of a transmitter station are used to transmit multiple downlink traffic streams to multiple receiver stations simultaneously.

BACKGROUND OF THE INVENTION

In a typical wireless network utilizing a coordination function for coordinating transmissions among wireless stations, such a function may be implemented in one of the wireless stations or a coordinator device such as an access point (AP). The wireless stations may communicate via directional transmissions using sector antennas and beam-forming antenna arrays. The coordinator device may use omnidirectional transmissions for broadcasts to all wireless stations in all directions (e.g., 360 degrees range). Alternatively, the coordinator may use quasi-omnidirectional transmissions for broadcasts to a wide range, but not necessarily in all directions.

In many wireless local area networks (WLANs) such as those according to IEEE 802.11 standards, a coordinator station in infrastructure mode is used for providing contention-free access to a wireless communication medium to support Quality of Service (QoS) for certain applications. In the absence of a coordinator, to provide contention-free channel time reservation, existing techniques use announcement or information exchange among wireless stations in a network to negotiate/reserve the use of the communication medium. In existing IEEE 802.11 standards, there are always one transmitter and one receiver for any frame exchange. A channel can be reserved between a sender and a receiver, through the exchange of request-to-send/clear-to-send (RTS/CTS) packets. However, such standards cannot support the case of one sender and multiple receivers.

BRIEF SUMMARY OF THE INVENTION

The present relates to wireless medium reservation for simultaneous transmission of multiple downlink spatial streams to multiple receiver wireless stations during a multi-user transmit opportunity over a wireless medium. Such a reservation includes reserving a transmission period for simultaneously transmitting data from a transmitting station to multiple intended receiving wireless stations on multiple downlink spatial streams over a wireless communication medium. Reserving the transmission period comprises generating a multi-user request-to-send (MU-RTS) frame and transmitting the MU-RTS frame to the multiple receiving stations. The MU-RTS frame includes a receiver address (RA) field that comprises a compressed RA field, wherein the compressed RA field comprises compressed addresses for the multiple receiving stations in the network. The MU-RTS frame includes an indication method that indicates the RTS frame as an MU-RTS without altering the existing RTS frame type/subtype.

These and other features, aspects and advantages of the present invention will become understood with reference to the following description, appended claims and accompanying figures.

BRIEF DESCRIPTION OF THE DRAWINGS

FIG. 2A shows a block diagram of a wireless system implementing downlink (DL) MU-MIMO for simultaneous multi-user communication, according to an embodiment of the present invention.

FIG. 2B shows a timing diagram of wireless channel access and transmission sequence in a MU-MIMO communication, according to an embodiment of the present invention.

FIG. 3C shows use of a reserved bit in the Service field for IEEE 802.11ac wireless devices, for indicating a MU-RTS frame, according to an embodiment of the invention.

FIG. 3E shows use of a reserved bit in the L-SIG field for IEEE 802.11n wireless devices and IEEE 802.11ac devices, for indicating a MU-RTS frame, according to an embodiment of the invention.

DETAILED DESCRIPTION OF THE INVENTION

The present invention relates to enhanced contention avoidance for communication medium access in multi-user (MU) multiple-input-multiple-output (MIMO) wireless networks. In one implementation, the communication medium comprises a wireless channel such as a radio frequency (RF) channel.

In one embodiment, the present invention relates to wireless networks where multiple antennas of a transmitter station are used to transmit multiple downlink traffic streams to multiple receiver stations simultaneously. Embodiments of the invention provide a contention avoidance mechanism comprising a multi-user RTS/CTS (request-to-send/clear-to-send) channel reservation protocol that enhances existing RTS/CTS techniques of wireless local area network (WLAN) standards. In one embodiment, the invention allows avoiding collisions from third party wireless stations to multiple simultaneously transmitted downlink traffic streams.

One implementation of the invention is useful for simultaneously transmitting multiple downlink (DL) spatial streams to multiple receiver wireless stations during a multi-user transmit opportunity over a wireless channel. The invention avoids frame collisions due to third party stations, and allows multiple simultaneously transmitted downlink traffic streams. The third party stations comprise hidden terminals that pose frame collision issues.

Figure 1A:
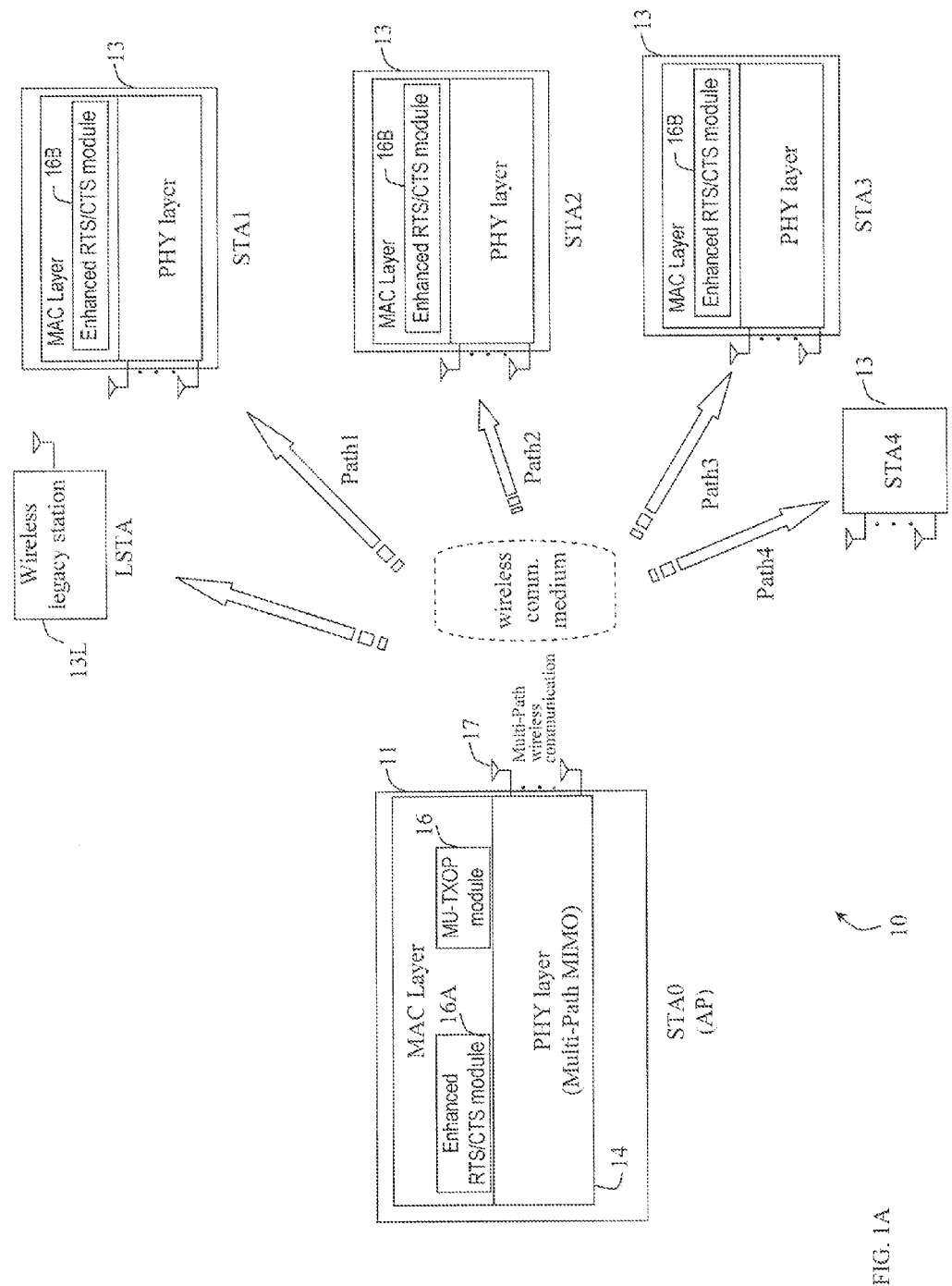
FIG. 1A shows a block diagram of a wireless system implementing an enhanced request-to-send (RTS)/clear-to-send (CTS) mechanism for communication channel reservation, and a multi-user transmit opportunity (MU-TXOP) for channel access, in multi-user multiple-input-multiple-output (MU-MIMO) communication, according to an embodiment of the present invention.

FIG. 1A shows a wireless network 10, according to an embodiment of the invention. The wireless network 10 comprises a wireless local area network (WLAN) comprising multiple wireless stations capable of communication over a wireless communication channel. In the embodiment shown in FIG. 1A, the wireless stations comprise a sender wireless stations 11, such as a wireless access point (AP) designated as STA0, and multiple receiving wireless stations 13 designated as STA1, STA2, STA3, STA4, etc. The network 10 further includes at least one legacy wireless station 13L designated as LSTA. In one embodiment, during a MU-TXOP, the STA0 communicates with the STA1, STA2, STA3 and STA4, via multi-path directional transmissions along multiple downlink spatial streams (or paths) Path1, Path2, Path3 and Path4. During a multi-user DL transmission, the AP cannot transmit to a legacy STA. The AP can transmit to the legacy STA outside a DL MU-MIMO transmission, using a one-to-one transmission.

Each wireless station in the network 10 comprises processor, memory, logic and a transceiver for wireless communication. A frame structure is used for data communication between wireless stations such as a transmitting (transmitter) station and a receiving (receiver) station. In one example, a frame structure in a Media Access Control (MAC) layer and a physical (PHY) layer is utilized, wherein in a transmitter station, a MAC layer receives a MAC Service Data Unit (MSDU) and attaches a MAC header thereto, in order to construct a MAC Protocol Data Unit (MPDU). The MAC header includes information such as a source address (SA) and a destination address (DA). A number of MPDUs can also be aggregated into an Aggregated MPDU (A-MPDU) to increase MAC layer throughput. The MPDU or A-MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. The PHY layer includes transmission hardware for transmitting data bits over a wireless link. Before transmission as a frame from the transmitter station to the receiver station, a preamble is attached to the PPDU, wherein the preamble can include channel estimation and synchronization information.

In one embodiment according to the invention, communication medium contention avoidance is utilized to obtain the channel. The sharing of the TXOP occurs after the channel is obtained. The method used to obtain the channel is EDCA under 802.11 channel access standard. MU-TXOP supports multiple downlink traffic streams to multiple receiver wireless stations simultaneously.

Enhanced Distributed Channel Access (EDCA) provides quality of service (QoS) support for certain applications using announcement or information exchange. EDCA defines four Access Categories (ACs) and introduces service differentiation such that certain data traffic uses higher priority parameters to contend for the communication medium. EDCA allows contention for transmission opportunities (TXOPs), wherein a TXOP is a time interval when a QoS wireless station (STA) may initiate frame transfer on the wireless medium (e.g., wireless channel). The TXOP may be assigned to the wireless station by a coordinator, or the wireless station may obtain the TXOP by successfully contending for the wireless channel.

Figure 1B:
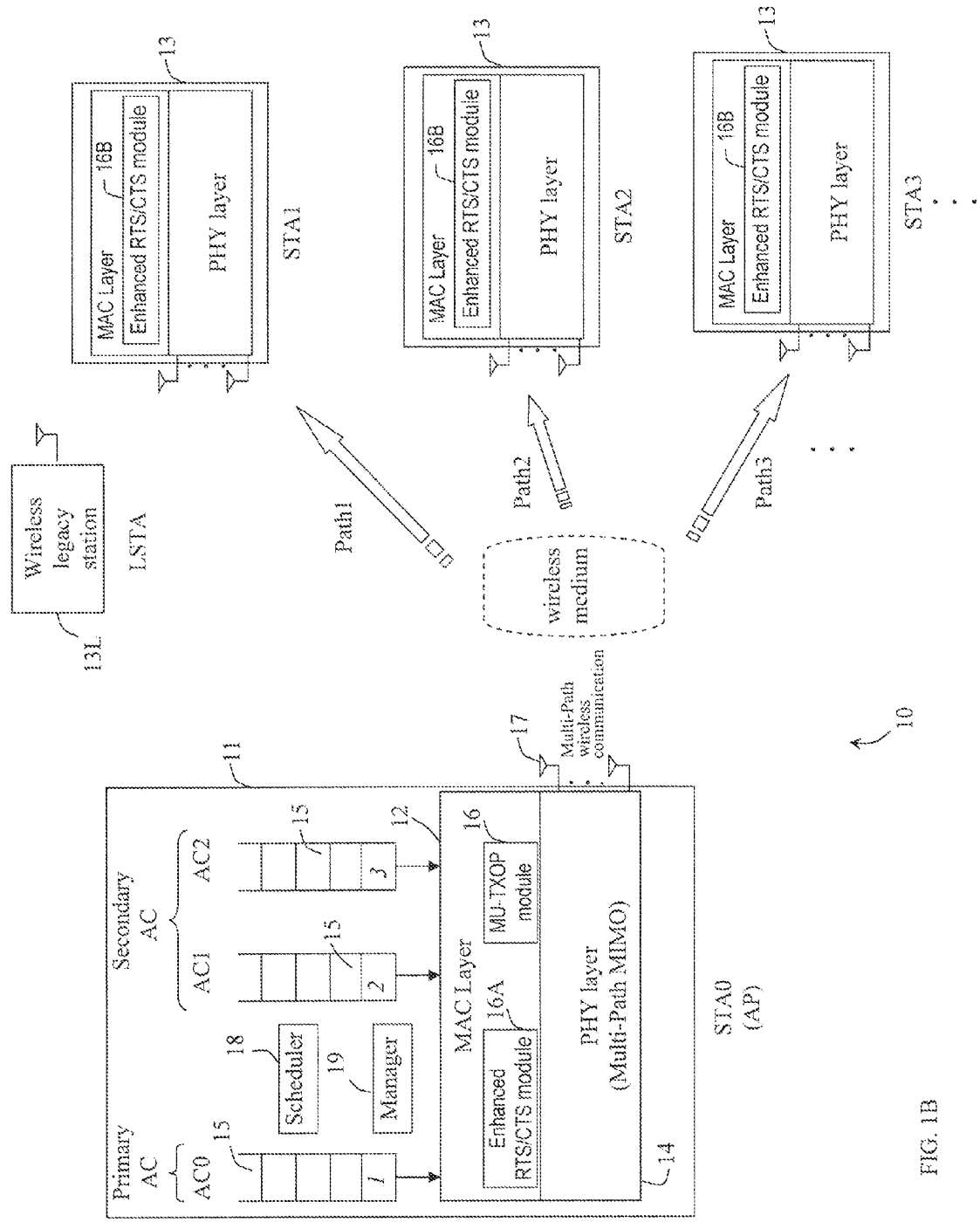
FIG. 1B shows a more detailed view of aspects of the system of FIG. 1A, according to an embodiment of the present invention.

FIG. 1B shows a more detailed view of the wireless network 10, according to an embodiment of the invention. As noted, the wireless station STA0 comprises an access point (AP) having a PHY layer 14 and a MAC layer 12 implementing an EDCA MU-TXOP module 16 according to the invention. In this example, there are three traffic streams (or queues) of data frames (packets) 15 for different Enhanced Distributed Channel Access (EDCA) access categories AC0, AC1, AC2 at the AP station for transmission to receiver stations 13 such as STA1, STA2, STA3, etc., respectively. In one embodiment, a scheduler 18 at the AP station determines which frames (data blocks) 15 are to be transmitted to multiple receiver stations, wherein the frames are organized into ACs based on QoS rules, and arranged into queues accordingly. A manager module 19 determines the primary AC to be used for contending for a transmission opportunity.

The MAC layer 12 further includes a channel access module 16A comprising an enhanced RTS/CTS module providing enhanced RTS/CTS channel access mechanisms, described further below, according to embodiments of the invention. Each receiver station includes a MAC layer 12 and a PHY layer 14, wherein the MAC layer 12 further implements an enhanced RTS/CTS module 16B providing enhanced RTS/CTS channel access mechanisms in conjunction with the enhanced RTS/CTS module 16A of the AP station, described further below, according to embodiments of the invention.

The AP station (STA0) further includes an enhanced RTS/CTS module 16A which implements the functions of the AP station for enhanced RTS/CTS for channel reservation described herein, according to embodiments of the invention. As noted, each non-legacy wireless receiver STA (e.g., STA1, STA2, STA3, STA4), includes an enhanced RTS/CTS module 16B which implements the functions of the non-legacy receiver STAs for enhanced RTS/CTS for channel reservation described herein, according to embodiments of the invention. As noted, FIG. 1B further shows a legacy station LSTA 13L which operates under enhanced RTS/CTS, as described herein. The LSTA also includes processor, memory, logic, a transceiver for wireless communication, and implements a MAC layer and a PHY layer.

According to an embodiment of the invention, a downlink Multi-User MIMO (DL MU-MIMO) protocol allows multiple traffic streams to be wirelessly transmitted from a transmitter station to multiple wireless receivers simultaneously via multiple spatial streams utilizing beam-forming, as illustrated by example in FIGS. 2A-2B (i.e., downlink transmission in multi-user MIMO). An enhanced RTS/CTS mechanism is provided herein for DL MU-MIMO for a wireless local area network (WLAN).

FIG. 2A illustrates a downlink transmission involving multi-user MIMO transmission of $Frame_1$, $Frame_2$, $Frame_3$ from the AP station to the receiver stations STA1, STA2, STA3 during a MU-TXOP, respectively, via multi-spatial-stream transmissions, according to an embodiment of the invention. FIG. 2B shows a timing diagram for the example communication in FIG. 2A, wherein during a MU-TXOP in a downlink phase, the AP station simultaneously directionally transmits three frames $Frame_1$, $Frame_2$, $Frame_3$ (each with a specified receiver address (RA)) to the receiver stations STAT, STA2 and STA3, respectively. In an uplink phase, each of the receiver stations sends a block acknowledgement (BA) to the AP station.

Embodiments of the invention provide an enhanced RTS/CTS mechanism that avoids frame collisions due to third party stations, and allows multiple simultaneously transmitted downlink traffic streams, as described below.

For downlink MU-MIMO, a wireless channel is reserved between a wireless transmitter (sender) and multiple wireless receivers. As one of the typical methods, Network Allocation Vector (NAV) information can be delivered to multiple receivers using a CTS-to-self packet. The CTS-to-self mechanism eliminates exchange of RTS/CTS messages and relies on a wireless station to determine channel availability before transmission. However, the CTS-to-self mechanism is incapable of accounting for hidden nodes (hidden stations/terminals) and collisions, especially when multiple Basic Service Sets (BSSs) are operating in the same wireless channel in the same neighborhood. A hidden node problem exists when a wireless node is visible from a wireless station such as an access point (AP), but is not visible from other wireless nodes communicating with the wireless station, causing media access control issues.

In addition, in a Very High Throughput (VHT) BSS (i.e., the BSS defined in IEEE 802.11ac), NAV information is not available by checking the Duration/ID Field in MAC Header of data frames for legacy wireless devices (e.g., IEEE 802.11a and IEEE 802.11n wireless devices) because such wireless devices are unable to decode a data frame if they are not the targeted receivers. Therefore, if a RTS/CTS mechanism is not used, the legacy devices may experience a long "idle" period between MU-MIMO Data and Ack frames, and begin transmission on the channel during the "idle" period, and eventually cause collisions. Further, exchanging RTS/CTS with only one of multiple target (destination) receivers cannot prevent collisions in the neighborhoods of all receivers.

Embodiments of the present invention provide an enhancement of existing RTS/CTS mechanisms for channel reservation in a downlink MU-MIMO environment with backward compatibility. The enhanced RTS/CTS mechanism according to the invention allows channel reservation among a wireless sender and multiple wireless receivers, while coping with the hidden node problem. Embodiments of the invention allow sending one RTS to multiple target receivers and receiving multiple CTSs reliably from all target receivers, with backward compatibility to legacy devices (e.g., legacy wireless stations).

Embodiments of the invention provide an indication mechanism to inform the receiver stations that the RTS they received is a Multi-User RTS (MU-RTS), without changing the frame type/subtype. Examples of such indication mechanism include: re-using (overloading) one of the bits in the frame control field of the MAC header, using one of the reserved bits in the VHT Service field of the frame, using one of the reserved bits in the VHT L-SIG field of the preamble of the frame, using one of the reserved bits in the VHT-SIG-A fields of the preamble of the frame, etc.

Embodiments of the invention provide an indication mechanism to inform the receiver stations that the RTS they received is a Multi-User RTS (MU-RTS) which includes multiple receiver address (RA) fields, instead of a regular RTS. According to embodiments of the invention, an RTS frame (Type=01 and Sub-Type=1011) is sent to up to four receiver STAs. Said indication mechanism is used to enable IEEE 802.11ac-capable devices to distinguish a MU-RTS frame from a regular RTS frame, such that said devices can further process the RTS to read the AIDs or Partial AIDs enclosed in the compressed RA field. At the same time, to maintain backward compatibility with IEEE 802.11a and IEEE 802.11n devices, said indication should prevent IEEE 802.11a and IEEE 802.11n devices from processing the additional information carried in the MU-RTS frame. As such, said indication mechanism according to embodiments of the invention, informs the receiver STAs that the RTS they received is a MU-RTS which includes multiple receiver address (RA) fields, instead of a regular RTS.

In one embodiment of the invention, said indication mechanism comprises using one of the bits in the frame control field of the MAC header to indicate a MU-RTS (overloading). In another embodiment of the invention, said indication mechanism comprises using one of the reserved bits in the VHT Service field of the RTS frame to indicate a MU-RTS. In another embodiment of the invention, said indication mechanism comprises using one of the reserved bits in the VHT L-SIG field of the preamble of the RTS frame to indicate a MU-RTS. In another embodiment of the invention, said indication mechanism comprises using one of the reserved bits in the VHT-SIG-A fields of the preamble of the RTS frame to indicate a MU-RTS. In addition to the above-mentioned embodiments, the present invention encompasses other approaches that can differentiate a VHT frame from a legacy frame (an IEEE 802.11a or an IEEE 802.11n frame) as an indication of a MU-RTS frame.

Figure 3A:
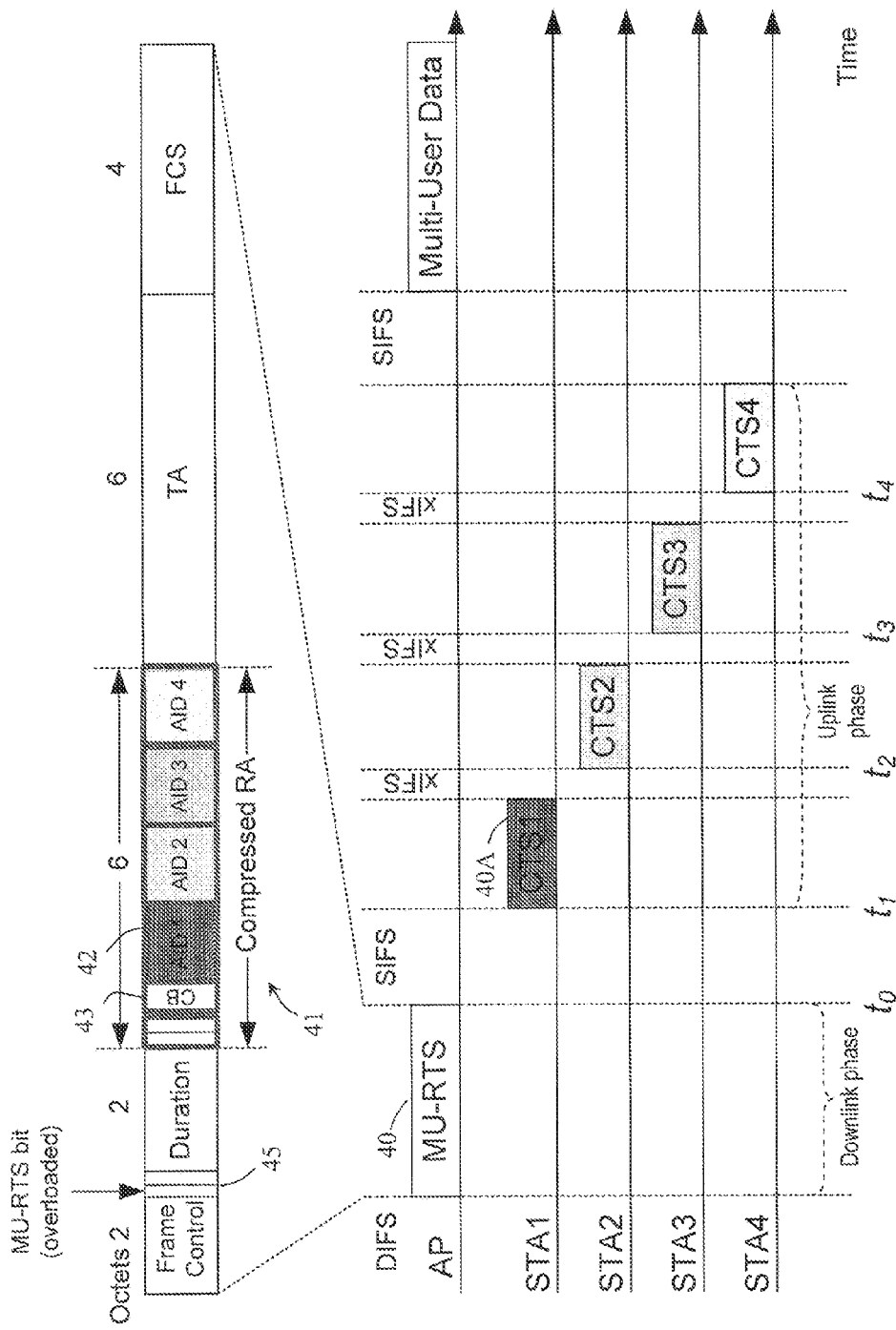
FIG. 3A shows a frame structure of an enhanced RTS and a timing diagram of a wireless channel reservation sequence using a multi-user RTS (MU-RTS) frame providing enhanced RTS/CTS channel reservation in a DL MU-MIMO wireless network environment, according to an embodiment of the invention.

Said embodiments of the indication mechanism are described below in relation to FIGS. 3A-3E. Referring to FIG. 3A, an implementation of an enhanced RTS/CTS mechanism according to the invention is illustrated. Specifically, FIG. 3A shows a timing diagram of a wireless channel reservation sequence for downlink MU-MIMO communication using the enhanced RTS/CTS mechanism in a downlink MU-MIMO wireless network environment such as network 10 in FIG. 1B. The example wireless channel reservation sequence in FIG. 3A is performed in advance of transmission of multi-user data. When a STA is able to send RTS, it has already obtained access to the wireless channel.

As illustrated in FIG. 3A, according to an embodiment of the invention, the enhanced RTS/CTS mechanism provides a compressed receiver address (RA) field 41 for a RTS frame 40 to be transmitted from a wireless sender such as a wireless AP station, to multiple wireless receivers such as wireless stations STAT, STA2, STA3, STA4 over a wireless channel. A MU-RTS indication bit 45 in a frame control field of the MAC header is used to indicate a MU-RTS. The RTS frame 40 comprises a MU-RTS frame for transmission to multiple receiver STAs in a MU-MIMO wireless network environment. The enhanced RTS/CTS mechanism/method further provides a shortened inter-frame space between multiple transmission of CTS frames from receiver STAs (e.g., 2xRIFS where RIFS stands for Reduced Inter-Frame Spacing in IEEE 802.11 standards), as described further below. In one embodiment, during a downlink phase, a MU-RTS 40 is transmitted from the transmitter (e.g., AP) to the receivers (e.g., STA1-STA4), and during a corresponding uplink phase, a response CTS 40A is transmitted from each of the receivers to the transmitter (i.e., CTS1, CTS2, CTS3, CTS4 from STA1, STA2, STA3, STA4, respectively).

According to an embodiment of the invention, the compressed RA field 41 is achieved using an Association ID (AID) 42, or Partial AID, instead of a typical full IEEE-48 MAC address. The AID is a value assigned by the AP station to each wireless station that associates with the AP station. The compressed RA field includes multiple AID fields 42 or Partial AIDs. The compressed RA field 41 further comprises Compatibility Bits (CB) 43, utilized to make the Compressed RA different from the MAC address of any existing legacy devices (e.g., IEEE 802.11a and IEEE 802.11n wireless devices).

Figure 4A:
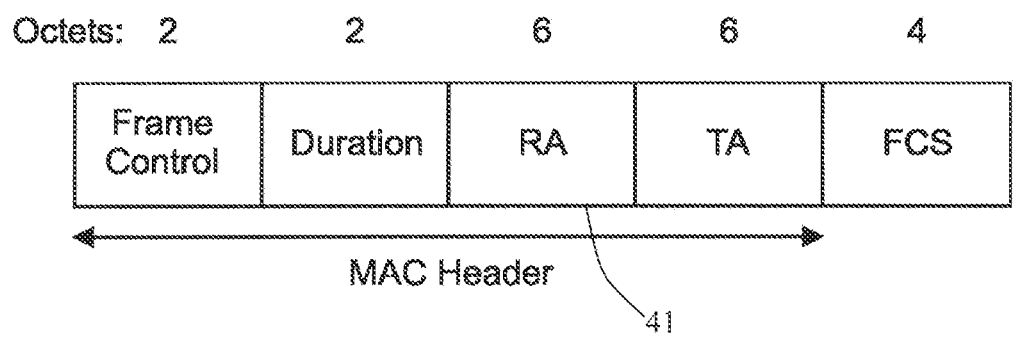
FIG. 4A shows an enhanced RTS frame including a compressed receiver address (RA) field, representing multiple wireless receiver stations, for enhanced RTS/CTS channel reservation in MU-MIMO communication, according to an embodiment of the invention.

FIG. 4A shows the RTS frame 40 with the compressed RA field 41 which represents multiple wireless receiver stations (receiver STAs). In one implementation, the compressed RA field 41 may carry up to four AIDs 42 for four receiver STAs (e.g., AID1, AID2, AID3, AID4 corresponding to STA1, STA2, STA3, STA4 in FIG. 3A).

According to an embodiment of the invention, a conventional RTS format is used (with the same type and sub-type values) but is enhanced as a multi-user RTS (MU-RTS), and is transmitted to up to four receivers. As such, an IEEE 802.11ac-capable wireless device is enabled to distinguish a MU-RTS from a conventional RTS to allow processing the AIDs enclosed in the compressed RA field.

Figure 4B:
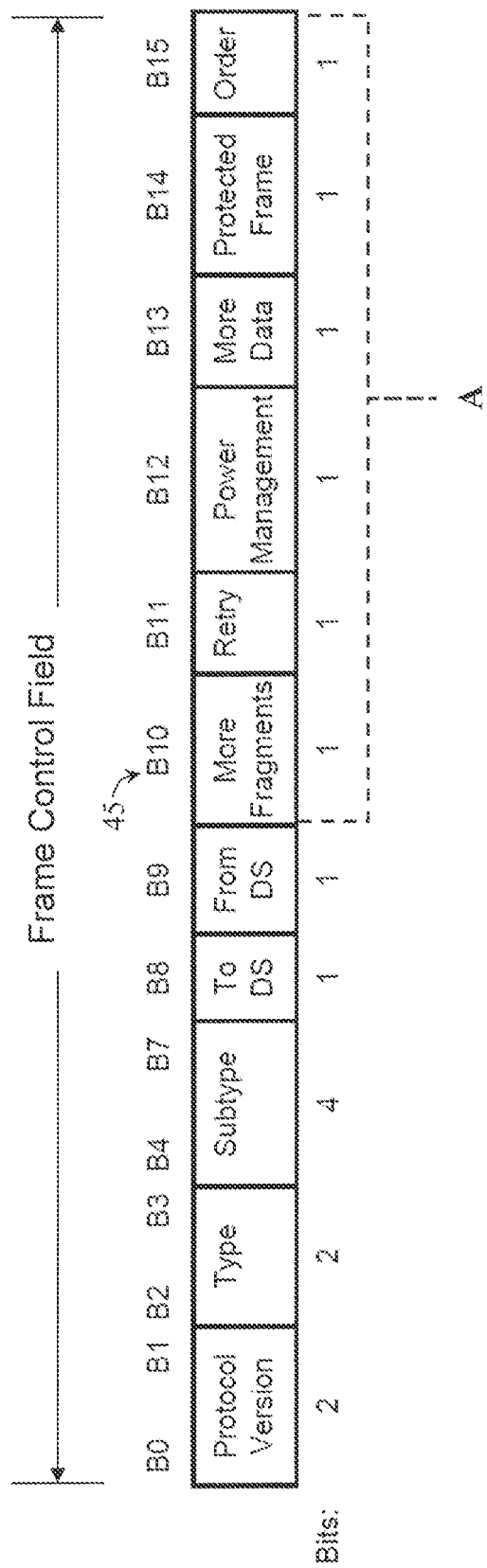
FIG. 4B shows using a bit of the Control Field in MAC header of a RTS frame, for indicating a MU-RTS frame, according to an embodiment of the invention.

FIG. 4B shows an example Control Field in MAC header shown in FIG. 4A. In a conventional RTS frame, several fields in the Frame Control field are irrelevant to RTS. Said fields include all fields grouped by marking "A" (6 bits/fields in total). These fields either apply to only data and management frames, or transmitted only from a wireless station (STA) to an access point (AP), but not transmitted from the AP to the STAs. An RTS frame is a control frame and is always transmitted from the AP to non-AP STAs to protect downlink multi-user transmissions. Therefore, the values of the fields marked as "A" are not checked when a RTS is received by the STAs. As such, according to an embodiment of the invention, one of the fields marked as "A" is used to indicate a MU-RTS, such as the bit 45 in FIG. 4B, without causing confusion at the receiver STAs. An IEEE 802.11ac-capable wireless device enabled accordingly, checks the value of the specific bit 45 when an RTS is received.

As shown by the Frame Control Field in FIG. 4B, in one implementation of the invention, one of the bits in the Frame Control field of the MAC header is used to indicate the difference between a conventional RTS and a MU-RTS disclosed herein. Although any of the bits in the group "A" in FIG. 4B can be used to indicate the MU-RTS, in a preferred embodiment disclosed herein, one of the least confusing bits, such as "More Fragments" (or "More Data") is overloaded as MU-RTS bit 45, providing a "MU-RTS" bit for a IEEE 802.11ac network when an RTS frame is transmitted. An IEEE 801.11ac-capable wireless receiver STA enabled accordingly, checks the value of the MU-RTS bit (i.e., MU-RTS field 45). When the value of this MU-RTS field is set to "1" by the AP station in the WLAN, the RTS 40 is targeting more than one receiver STA, and the RA field is to be interpreted as a Compressed RA field 41, wherein the receiver STA reads the AID values contained in the Compressed RA field 41 (FIG. 3A). When the value of the MU-RTS field is set to "0" by the AP station, the RTS is targeting only one receiver STA, wherein the RA field contains only 48-bit MAC address of one STA. The operation of a STA when an RTS is received is described further below.

Figure 3B:
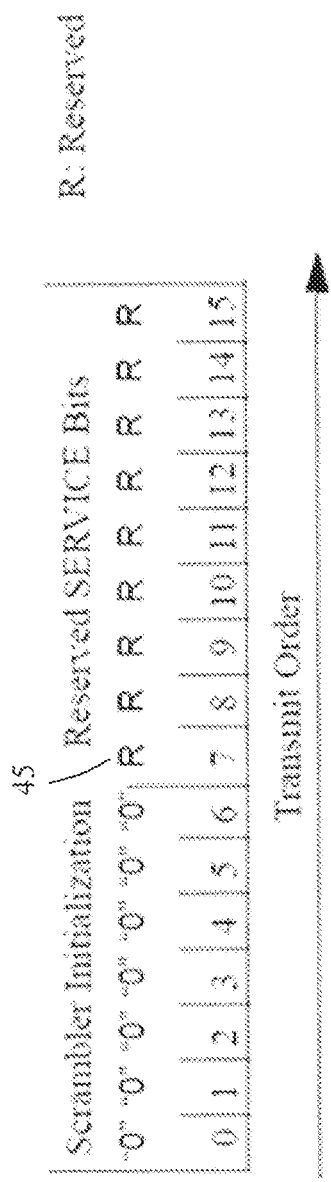
FIG. 3B shows use of a reserved bit in the Service field for IEEE 802.11a and IEEE 802.11n wireless devices, for indicating a MU-RTS frame, according to an embodiment of the invention.
Figure 3D:
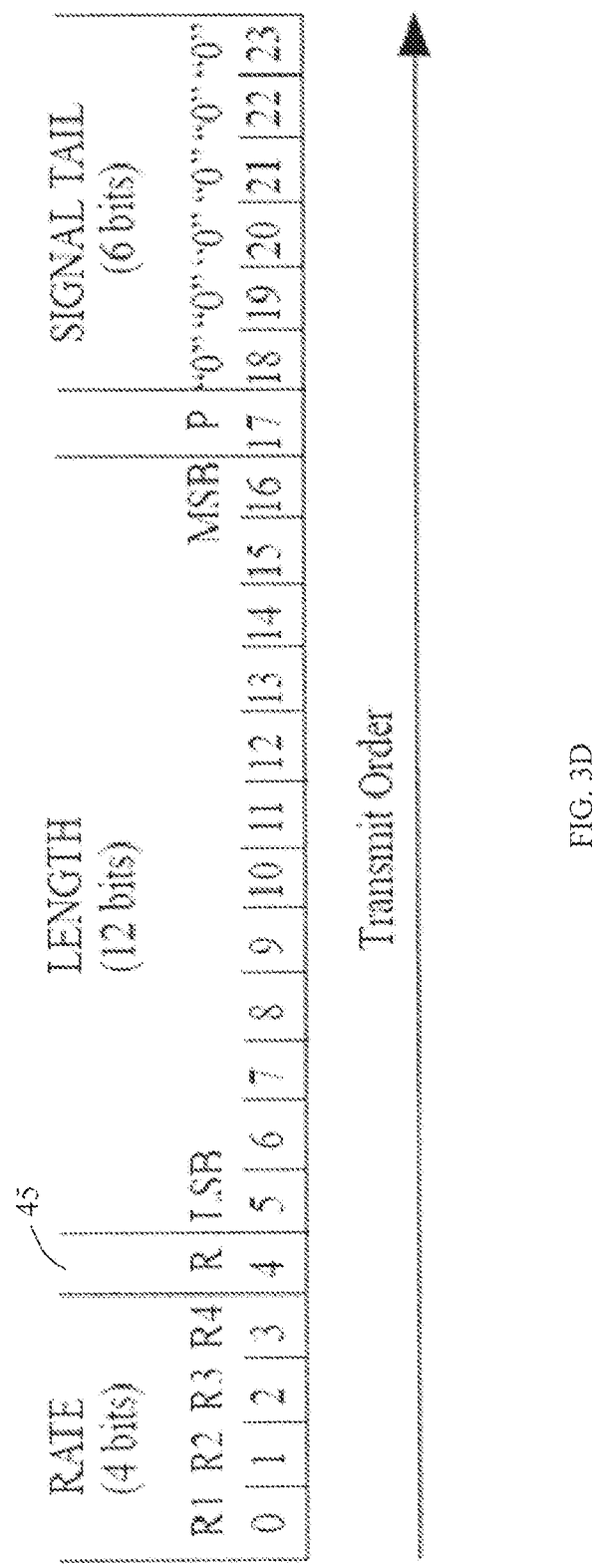
FIG. 3D shows use of a reserved bit in the L-SIG field for IEEE 802.11a wireless devices, for indicating a MU-RTS frame, according to an embodiment of the invention.

According to another embodiment of the invention, said indication mechanism comprises using one of the reserved bits in the Service field of the PLCP (Physical Layer Convergence Protocol) header in the IEEE 802.11a, IEEE 802.11n and IEEE 802.11ac standards. FIG. 3B shows reserved bits available in a Service field for IEEE 802.11a and IEEE 802.11n wireless devices. In one embodiment of the invention, of the reserved bits in the Service field, which is common to all IEEE 802.11a, 802.11n and 802.11ac frames, is used as an MU-RTS bit 45 to indicate a MU-RTS to IEEE 802.11ac STAs. FIG. 3C shows an example of the reserved bits that are available in the Service field for IEEE 802.11ac devices. In one example, bit 7 (B7) for both for the IEEE 802.11a, 802.11n and 802.11ac frames is used as the MU-RTS bit 45 for MU-RTS frames. The MU-RTS bit 45 can be set to "1" in an IEEE 802.11ac MU-RTS frame to indicate that it is not a legacy RTS frame, wherein legacy devices (i.e., IEEE 802.11a and IEEE 801.11n devices) will not process such an RTS frame.

According to another embodiment of the invention, said indication mechanism/method comprises utilizing one of the reserved bits in the L-SIG field of the preamble of the RTS frame as the MU-RTS bit 45 to indicate a MU-RTS. The L-SIG field is also known as the Signal field, to indicate a legacy signal field (in IEEE 802.11a, FIG. 3D), as compared to HT (high throughput in IEEE 802.11n, FIG. 3E) and VHT (very high throughput in IEEE 802.11ac, FIG. 3E). The L-SIG field is used to communicate rate and length information. According to an embodiment of the invention, in both formats (FIGS. 3D-3E), bit 4 is used as a MU-RTS bit 45 to indicate an MU-RTS frame. The value of the MU-RTS bit 45 can be set to "1" in an IEEE 802.11ac MU-RTS frame to indicate that the RTS is not a legacy RTS frame, wherein legacy devices (IEEE 802.11a and IEEE 802.11n devices) will not process the RTS frame.

According to another embodiment of the invention, said indication mechanism comprises utilizing one of the reserved bits in the VHT-SIG-A fields of the preamble of the RTS frame. The VHT-SIG-A field of VHT preamble carries information to interpret VHT format packets. Currently, the following bits are reserved and can be used as an MU-RTS bit 45 for MU-RTS frames. In one example, for IEEE 802.11ac, a VHT-SIG-A field may include two sub-fields, the VHT-SIG-A1 field and the VHT-SIG-A2 field. In VHT-SIG-A1: Bit B2 (reserved, default value=1), B23 (reserved, default value=1).

In VHT-SIG-A2: Bit B9 (reserved, default value=1). In one embodiment of the invention, anyone of said reserved bits B2, B23, B9 may be used as a MU-RTS bit 45 and set to "0" in an IEEE 802.11ac MU-RTS frame to indicate that the RTS it is not a legacy RTS frame, wherein legacy devices (i.e., IEEE 802.11a and IEEE 802.11n devices) will not process the RTS frame.

Figure 4C:
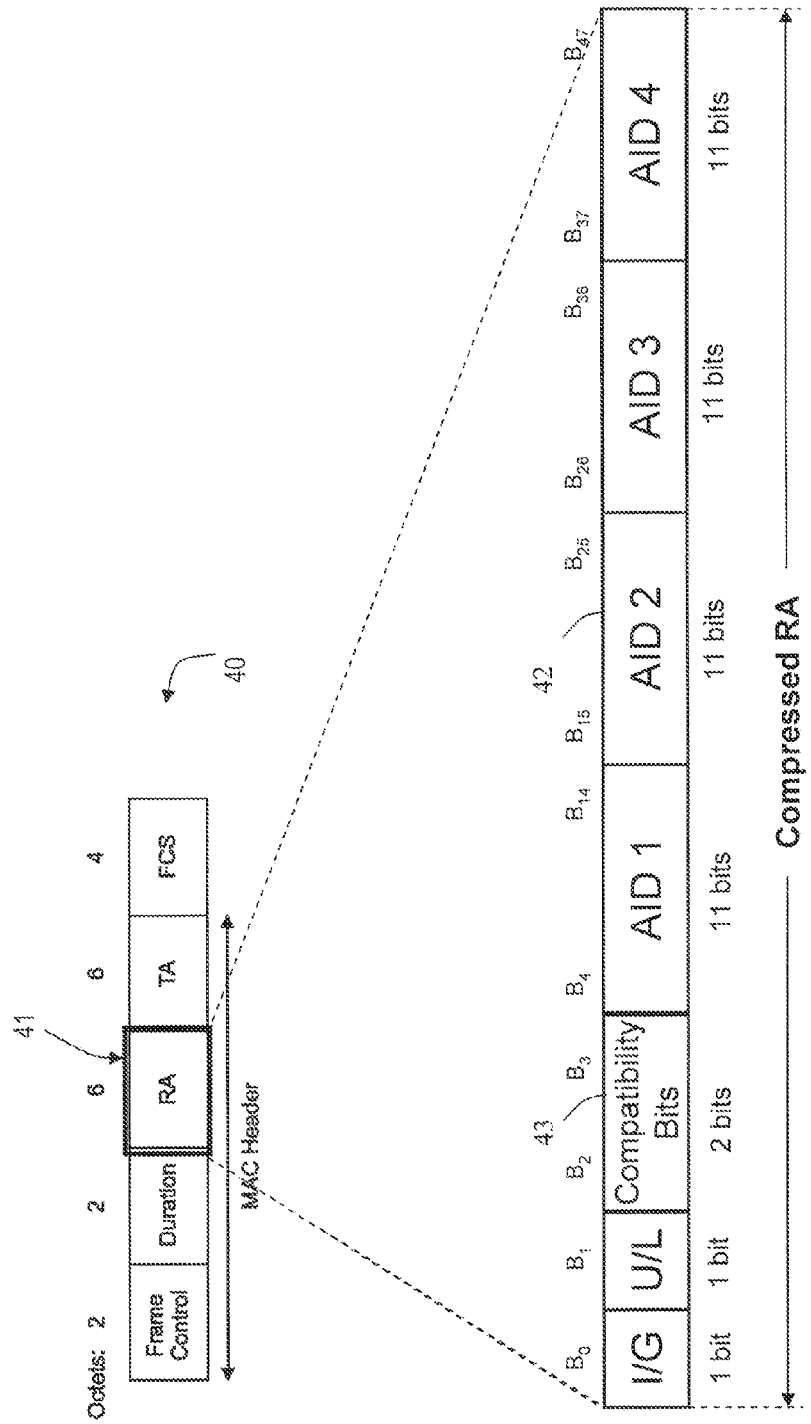
FIG. 4C shows an example field structure of a compressed RA field of an MU-RTS including multiple AID fields, according to an embodiment of the invention.
Figure 5:
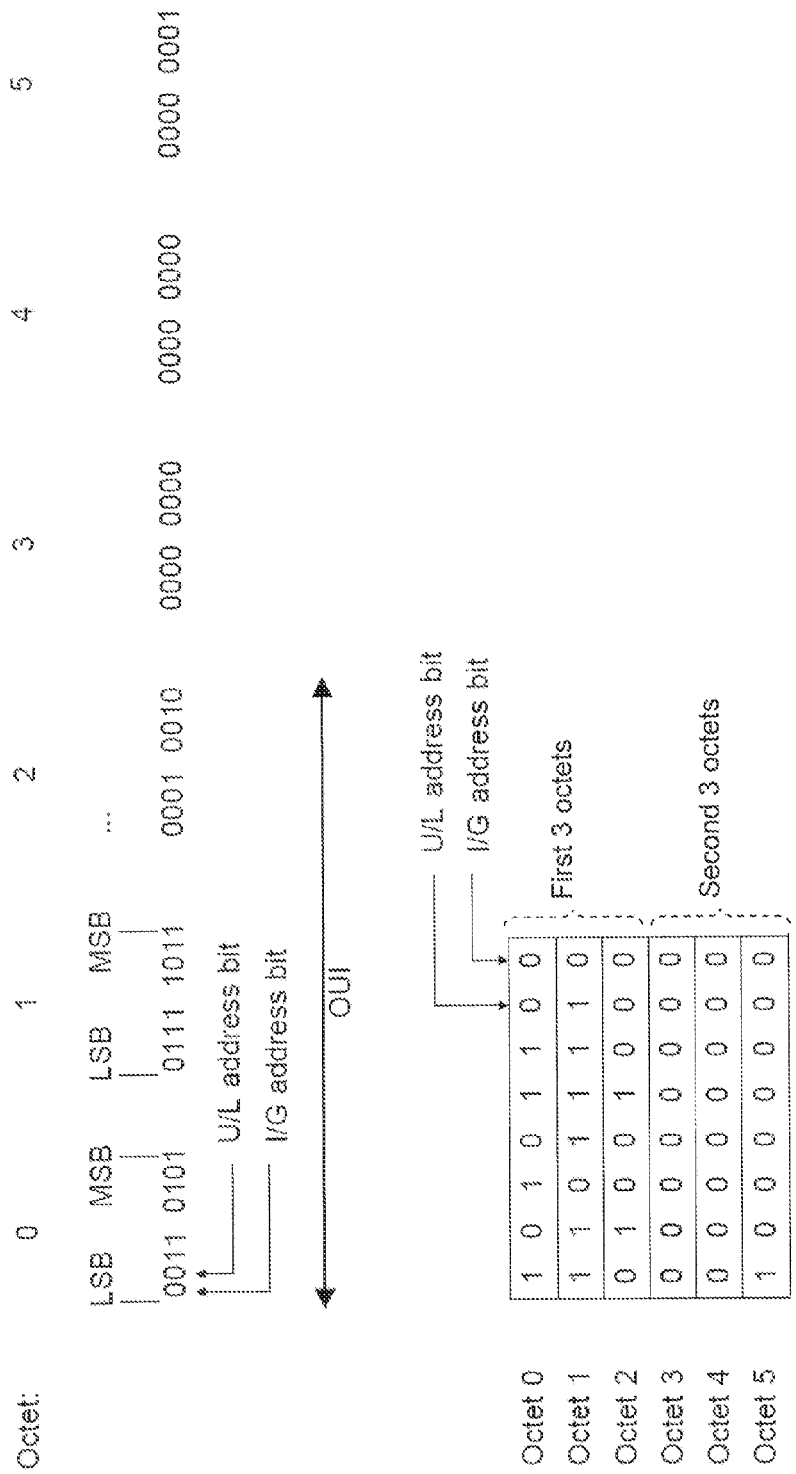
FIG. 5 shows an IEEE MAC-48 address structure.

Referring to FIG. 4C, according to an embodiment of the invention, the Compressed RA field 41 in the MU-RTS 40 of FIG. 3A, represents up to four receivers. The meaning of the I/G and U/L fields in the Compressed RA field 41 is described below. According to IEEE standard 802-2001 (R2007), IEEE Standard for Local and Metropolitan Area Networks: Overview and Architecture, 2007, an IEEE MAC-48 address is defined as shown in FIG. 5. The first 3 octets (0, 1, 2, in transmission order) are called Organizationally Unique Identifier (OUI), which identify the organization that issued the identifier. In the OUI, a I/G address bit indicates whether this is an individual address or a group address, and a U/L address bit indicates whether this is a "universally administered address" or a "locally administered address". A universally administered address is uniquely assigned to a wireless device by its manufacturer and it is globally unique. It is sometimes called a burned-in address. A locally administered address is assigned to a wireless device by a network administrator, overriding the burned-in address. Locally administered addresses do not contain OUIs. The second 3 octets (3, 4, 5 in transmission order) are called a Network Interface Controller (NIC) identifier, which can be assigned by an organization.

Figure 6A:
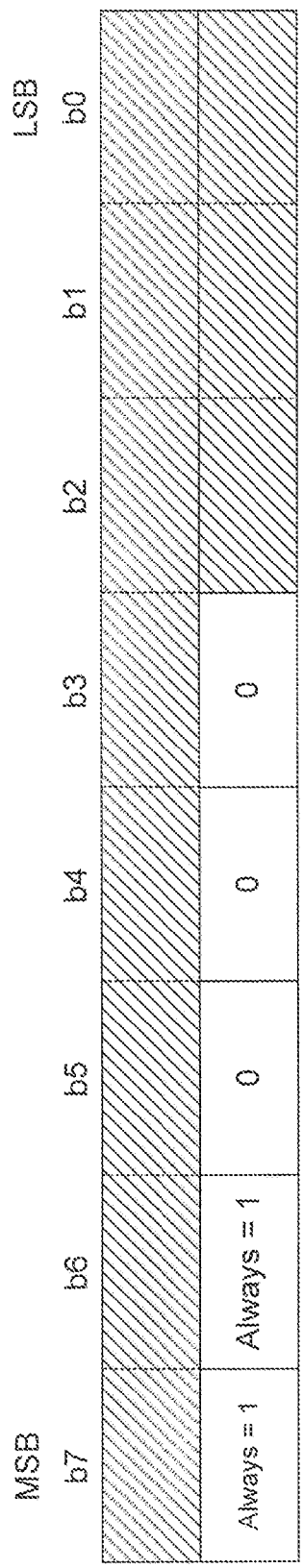
FIG. 6A shows an example field structure of an AID in a compressed RA field, according to an embodiment of the invention.

FIG. 6A shows the field structure of an AID 42, according to an embodiment of the invention. In FIG. 6A, MSB represents most significant bits and LSB represents least significant bits, among bits b0-b7. Each AID 42 is a value assigned to a corresponding receiver STA by the AP station in an association response frame that establishes current association of that receiver STA. Each AID 42 is a field that is carried by several MAC layer frames and it has the following features. Each AID field is of 2-octet long and it always has its two MSBs b7 and b6 of the second octet set to 1.

An AID is always unique in a Basic Service Set (BSS) so it can be used to uniquely identify a STA. Valid AID values range from 1 to 2007 (i.e., using only 11 bits even though the total length of the field is two octets). Up to 2007 receiver STAs can be uniquely addressed in a BSS. The AID values 0, and 2008 through 16383, are reserved. In the Compressed RA field 41, each AID 42 is only 11 bits long, according to an embodiment of the invention in order to conserve space. As such, only 11 bits are used to identify a unique STA in a BSS, as shown by diagonally stippled area in FIG. 6A.

According to an embodiment of the invention, the compressed RA field comprises six Octets capable of representing at least four AID values corresponding to at least four receiver stations. Bit 0 of Octet 0 indicates whether the compressed RA field represents an individual receiver station address or compressed addresses for multiple receiver station addresses. Bit 1 of Octet 0 indicates whether the compressed RA field represents a universally administered address or a locally administered address. Bits 2-3 of Octet 1 comprise Compatibility Bits (CB) configured to ensure that the compressed addresses do not equal any actual addresses in the network. Each AID comprises 11 bits, such an AID field is set to 0 if it is not used to indicate any receiver station address, wherein the order of the AIDs presented in the compressed RA field indicates order of transmission of CTS frames from intended receiving stations back to the AP station over the wireless medium.

According to an embodiment of the invention, Compatibility Bits 43 (FIG. 3A) comprise 2 bits in length, and are to distinguish the temporary (only valid for the immediate transmission following the RTS/CTS exchange) and virtual Compressed RA field 41 from any existing MAC addresses of the legacy wireless devices (including both IEEE 802.11a and IEEE 802.11n wireless devices) present in the BSS. An example usage of the Compatibility Bits 43 is described below.

A Compressed RA 41 cannot be the same as the MAC address of any legacy wireless device, otherwise a matching legacy wireless device will treat the Compressed RA as its own MAC address and process the RTS frame. A Compressed RA can be the same for one or more IEEE 802.11ac-capable wireless devices, as enabled according to the present invention, since such devices process an RTS further to determine whether it is a MU-RTS or a regular RTS (i.e., by checking the MU-RTS field 45, as described further above). The IEEE 802.11ac-capable wireless devices enabled according to the present invention may use the AIDs 42 in the Compressed RA field 41 to determine whether they are the targeted STAs.

Three example approaches for creating a unique Compressed RA 41 that is different from any regular MAC addresses of the legacy wireless devices in the BSS, according embodiments of the invention, are described below. In a first approach, always set the U/L Address bit (Bit1) to 1 to indicate a locally assigned address. A locally assigned address is only meaningful within a BSS. Because for every commercial product the U/L address bit will be set to "0" to indicate a "universally administered address", by using this method, the Compressed RA is made different from most of the MAC addresses of the most legacy devices.

In a second approach, if after the first approach the Compressed RA field still matches one or more of MAC addresses of the legacy wireless devices in the BSS, an AP can change the value of the Compatibility Bits to make the Compressed RA a different address. In a third approach, if after the first and second processes, the Compressed RA field still matches one or more of MAC addresses of the legacy wireless devices in the BSS, the AP can switch the order of the AIDs listed in the compressed RA field to make it a different value.

An example operation scenario for an AP station using AIDs in a compressed RA field of a MU-RTs frame for enhanced RTS/CTS exchange according to an embodiment of the invention is now described. The AP station determines up to 4 targeted (intended) receiver STAs, and obtains AIDs of the receiver STAs. The AP station then generates a Compressed RA field 41 for an MU-RTS 40, ensuring the Compressed RA does not match any MAC address of the legacy STAs. The AP station records the order of the AIDs of the receiver STAs in the compressed RA field (responsive CTSs from the receiver STAs are expected to be received at the AP station in this order).

The AP station composes the MU-RTS frame 40 as typical except that the AP station replaces the typical (regular) RA field with the compressed RA field 41 (FIG. 4A), sets the MU-RTS bit 45 in the Frame Control field to "1", and replacing the regular RA field with the generated compressed RA field. The values of the Duration field needed to cover transmission of the longest data frame from the AP station and multiple immediate responses from the receiver STAs are set.

The AP station then transmits the MU-RTS frame 40 on the wireless channel in broadcast mode. The timers for the expected CTSs from the multiple receiver STAs are set to reflect the number of CTSs expected and the interframe spacings between multiple CTSs.

In response to the MU-RTS, the AP station receives a CTS from each receiver STA. If all expected CTSs are received at the AP, the enhanced RTS/CTS exchange according to the invention is done successfully. The AP station can start transmitting data frames. If one or more expected CTSs in response to the MU-RTS do not arrive at the AP station, the AP station may either send another MU-RTS with a revised Duration value, or during a MU-TXOP begin transmitting data frames to the receiver STAs that have replied with CTSs. After data frame transmission, the AP station releases the remainder of the MU-TXOP.

An example operation scenario for a receiver STA in enhanced RTS/CTS exchange using AIDs in a compressed RA field of a MU-RTS frame, according to an embodiment of the invention is now described. For a legacy wireless receiver STA (i.e., a receiver STA which does not operate according to IEEE 802.11ac protocol), when the legacy STA receives a MU-RTS 40 from the AP station, the legacy STA checks the compressed RA field 41 of the MU-RTS 40 and finds the address in the compressed RA field 41 field does not match the MAC address of the legacy STA. As such, the legacy STA determines that it is not the intended (target) receiver for the frame. The legacy STA updates its NAV using a value indicated in the Duration field of the MU-RTS 40, wherein the legacy STA does not transmit until the NAV counts down to zero.

Figure 7:
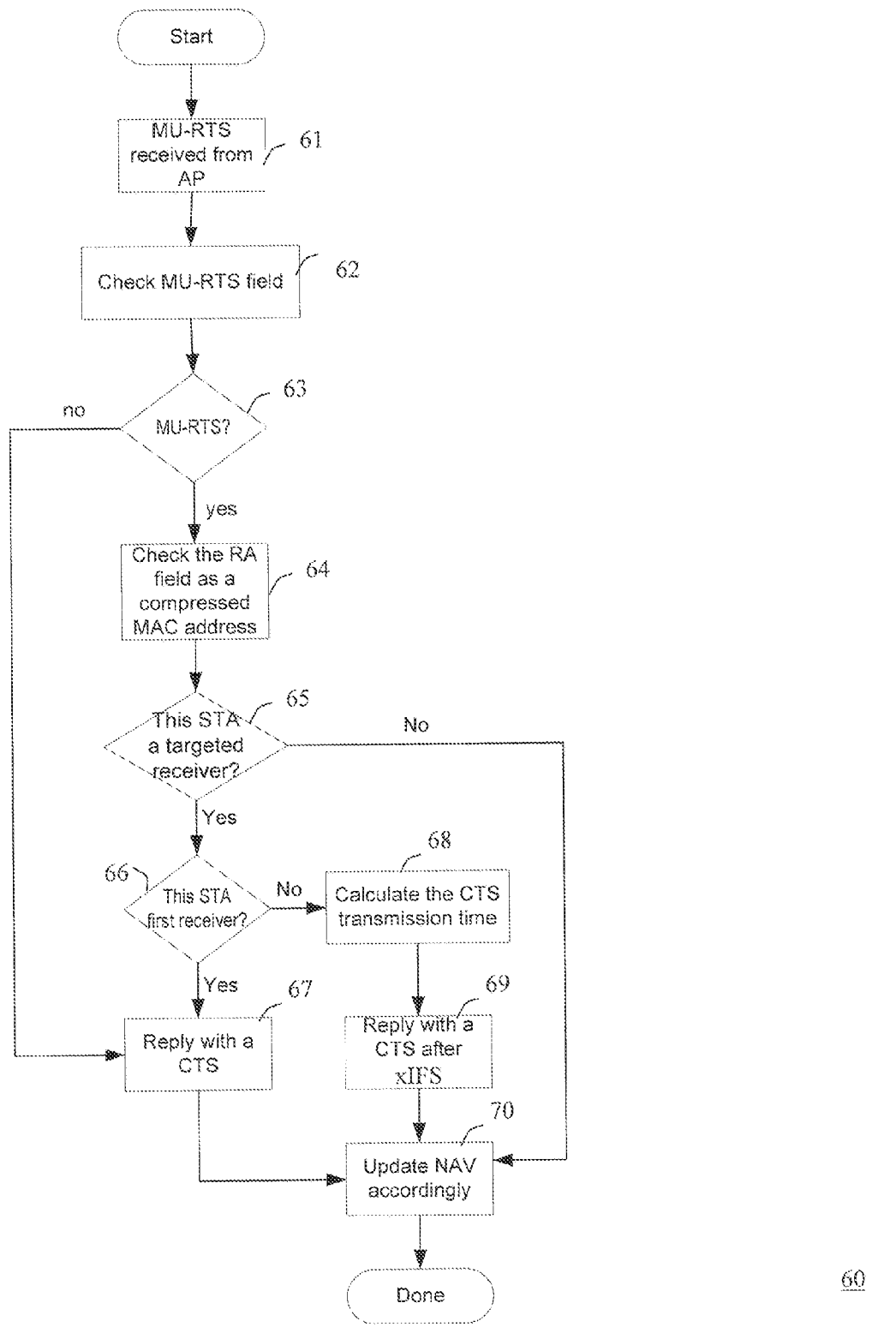
FIG. 7 shows a flowchart of a receiving station operation process, according to an embodiment of the invention.

FIG. 7 shows a flowchart of the process 60 for a receiving STA operation described above, according to an embodiment of the invention. For a non-legacy receiver STA which operates according to the IEEE 802.11ac protocol, when the non-legacy STA receives a MU-RTS 40 from the AP station, the non-legacy STA check the address in the TA field (the AP's address) to avoid duplicate AIDs in nearby OBSSs (process block 61). The STA also checks the MU-RTS field 45 (process block 62) and to determine if this is a MU-RTS frame (process block 63). If not a MU-RTS frame, the process is the same as a single-user RTS. If it is a MU-RTS frame, the STA parses the RA field therein (process block 64) and checks if the AID in the compressed RA field matches the MAC address of the STA as the intended receiver (process block 65).

If the STA determines that the RA field is a compressed RA field, and the STA is one of the intended receivers STAs, the STA determines its order in the compressed RA field to calculate CTS send time (process block 66). If the STA is the first receiver (process block 67), then it calculates the correct Duration value and replies with a regular CTS immediately after Short Interframe Space (SIFS in IEEE 802.11 standards) from the end of the reception of the MU-RTS. If the STA is not the first receiver (process block 68), then it calculates the correct hold off duration value and in process block 69 replies with a regular CTS after xIFS wherein xIFS represents any appropriate IFS (i.e., multiples of IFS). Embodiments of the invention are not limited to 2xRIFS interframe spacing.

However, if the STA is not one of the intended receivers indicated in the compressed RA field (process block 65), the STA updates its NAV using the value indicated in the MU-RTS Duration field (process block 70).

Using the enhanced RTS/CTS exchange according to an embodiment of the invention, the AP station may address up to 4 receiver STAs, depending on the number of bits that can be used for each AID. In FIG. 3A, $t_0$ indicates the end of RTS transmission time, and $t_1$ through $t_4$ indicate the CTS transmission times. Each receiver is addressed in the compressed RA using a unique AID.

Embodiments of the invention are backward compatible with legacy stations, wherein the use of a compressed RA field in MU-RTS eliminates the need for a new type of frame format. Legacy STAs treat the MU-RTS as an RTS for other receiver STAs and can correctly update their NAVs.

Embodiments of the invention provide efficiency since in one example shown in FIG. 3A, the compressed RA field of a MU-RTS provides use of one MAC address field to holds up to 4 receiver station addresses, thereby reducing the MU-RTS frame size. The AP station uses existing information to differentiate different receiver STAs, wherein both AID and MAC addresses are information known to the AP station (or are readily available for the AP station to obtain).

Figure 4D:
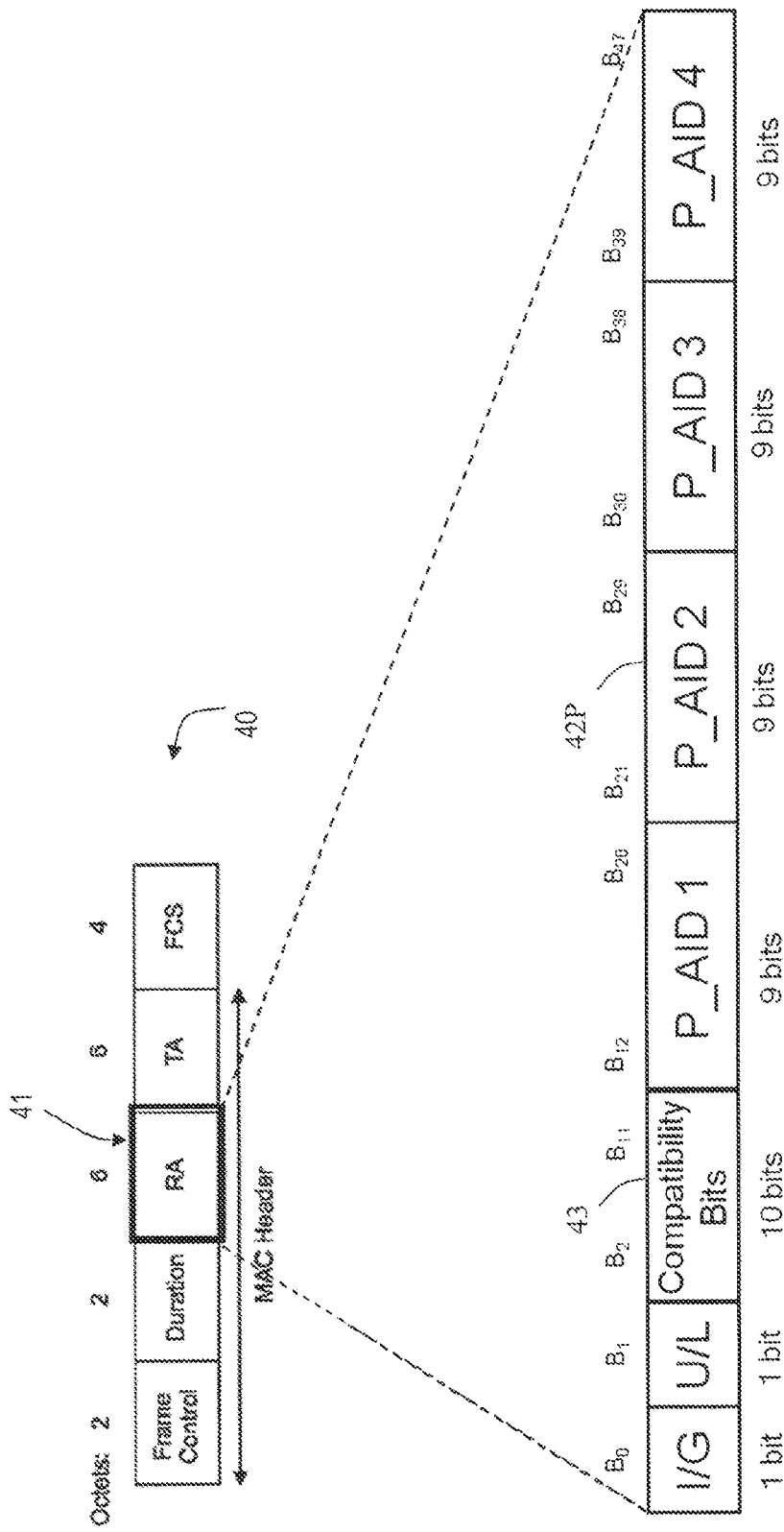
FIG. 4D shows an example field structure of a compressed RA field of an MU-RTS including multiple partial Association ID (AID) fields, according to an embodiment of the invention.

According to another embodiment of the invention, a compressed RA field 41 may include partial AIDs, as shown by example in FIG. 4D. The compressed RA field comprises six Octets capable of representing at least four AID values corresponding to at least four receiver stations. Bit 0 of Octet 0 indicates whether the compressed RA field represents an individual receiver station address or compressed addresses for multiple receiver station addresses. Bit 1 of Octet 0 indicates whether the compressed RA field represents a universally administered address or a locally administered address. Bit 2 of Octet 1 to Bit 3 of Octet 2 comprise Compatibility Bits (CB), 10 bits long, configured to ensure that the compressed addresses do not equal any actual addresses in the network. Each P_AID comprises 9 bits, such that a P_AID field is set to 0 if it is not used to indicate any receiver station address, wherein the order of the AIDs presented in the compressed RA field indicates order of transmission of CTS frames from intended receiving stations back to the AP station over the wireless medium.

Figure 6B:
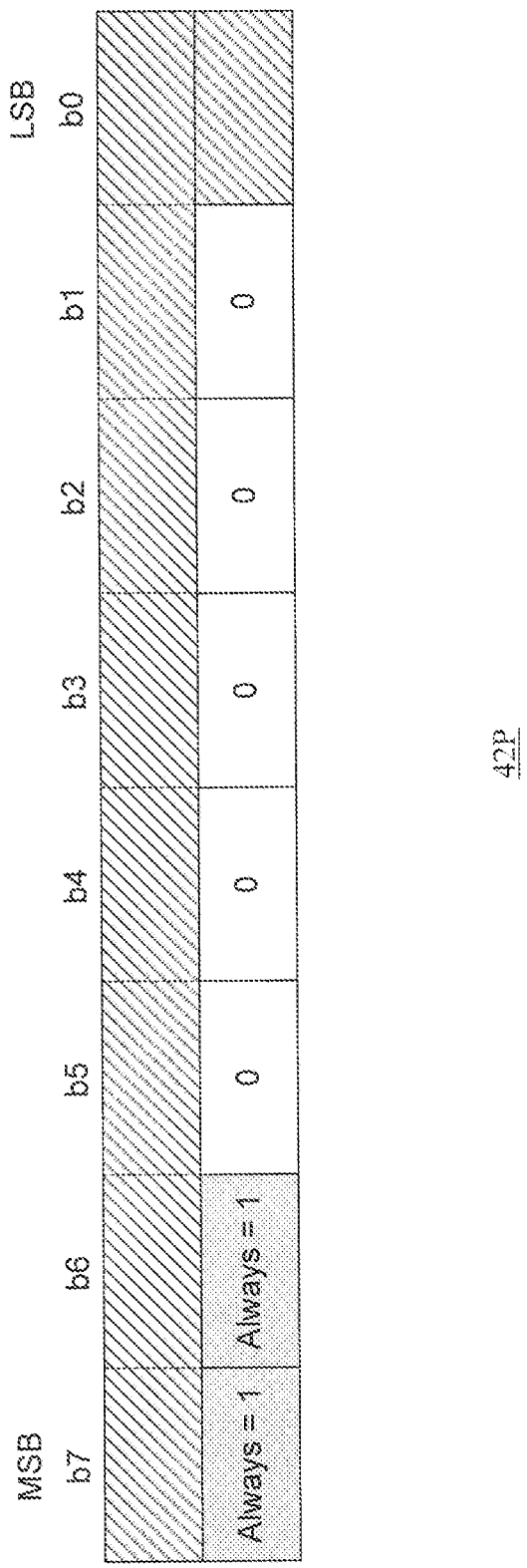
FIG. 6B shows an example field structure of a partial AID in a compressed RA field, according to an embodiment of the invention.

In one example, a partial AID (P_AID) 42P includes 9 LSBs of an 11-bit AID 42. With the use of partial AIDs, the Compatibility Bits can be as long as 10 bits allowing a unique Compressed RA different from any regular MAC addresses of the legacy devices in a BSS. FIG. 6B shows the field structure of a partial AID 42P, according to an embodiment of the invention. In one embodiment of the invention, 9 fields indicate the 9 partial AID bits, as shown by diagonally stippled area in FIG. 6B.

Figure 8:
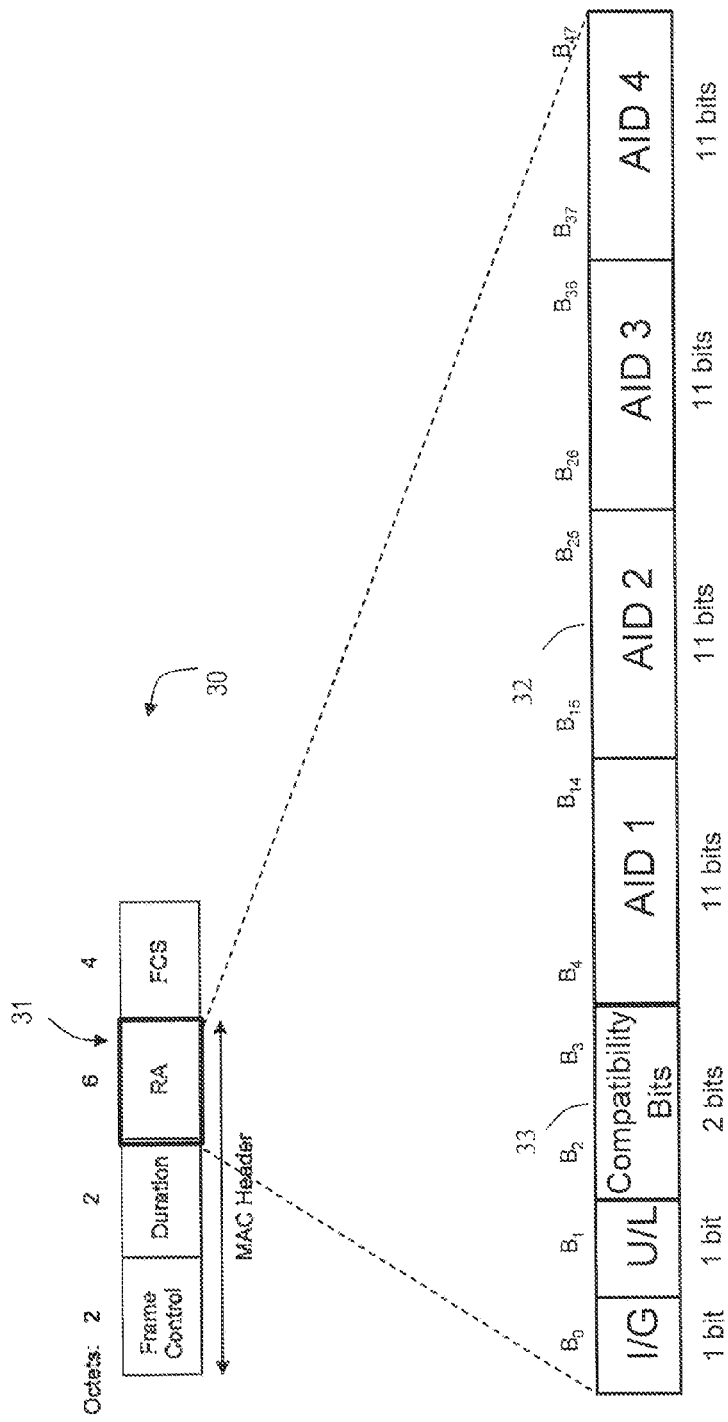
FIG. 8 shows an example field structure of a compressed RA field of multi-user CTS (MU-CTS) including multiple AID fields, according to an embodiment of the invention.
Figure 9:
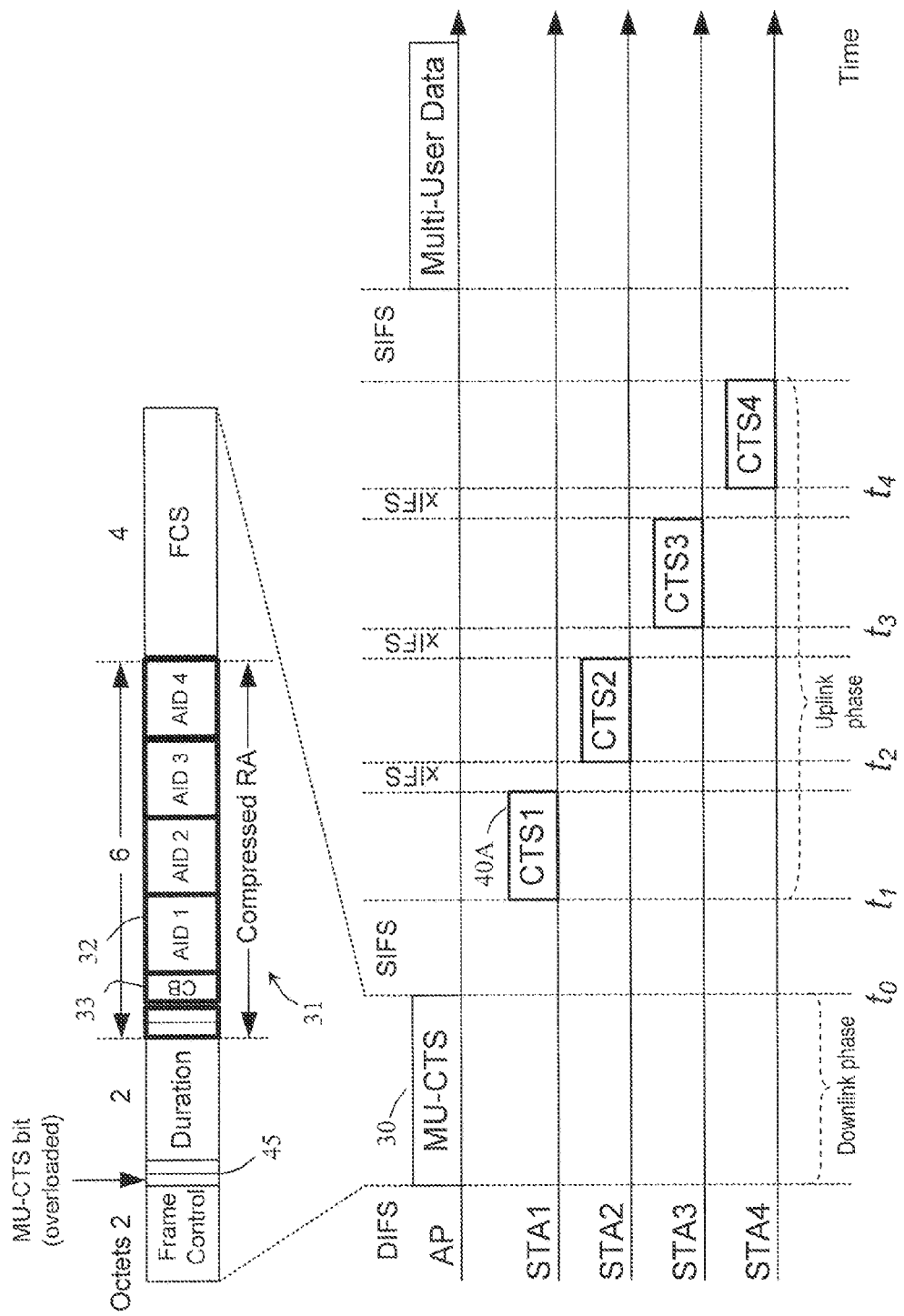
FIG. 9 shows a frame structure of an enhanced CTS and a timing diagram of a wireless channel reservation sequence using a multi-user CTS (MU-CTS) frame of FIG. 8, providing an alternative RTS/CTS channel reservation in a DL MU-MIMO wireless network environment, according to an embodiment of the invention.

According to another embodiment of the invention, a CTS frame (Type=01 and Sub-Type=1100) can be sent to up to four recipient wireless stations as a MU-CTS 30, as shown in FIG. 8. The RA field of such a CTS frame is replaced with a Compressed RA field 31, to generate the MU-CTS frame 30. The RA field 31 is similar to RA field 41 described above, and includes compatibility bits 33 and AIDs 32. FIG. 9 illustrates a frame exchange sequence for the MU-CTS 30, similar to the frame exchange in FIG. 3A for MU-RTS 40. As shown in FIG. 9, multiple CTSs will follow the MU-CTS 30. As such, the function of the MU-CTS 30 is to call for CTSs from targeted recipients, even though it is named CTS. Note the AID fields 32 in the compressed RA field can also be partial AID fields.

As such in one embodiment of the invention, MU-RTS is used for the downlink, and multiple, individual CTSs for the uplink (i.e., a CTS for each target STA). In an alternative embodiment of the invention, MU-CTS is used for the downlink, and individual CTSs for the uplink (i.e., a CTS for each target STA).

Embodiments of invention provide a compressed RA field to host multiple receiver MAC addresses. Compressed RA fields are generated wherein, in one embodiment, the compressed RA field can contain up to four AIDs. The compressed RA field is different from any real (actual) MAC address in the BSS. This includes the uses of: the U/L address bit, the Compatibility Bits and the shuffle of the order of receiver STAs' AIDs. One of the bits in the frame control field of a MAC layer header of a IEEE 802.11 frame are re-used (overloaded) to indicate the multi-user RTS. The use of compressed RA field of MU-RTS, according to embodiments of the invention, eliminates the need for a new type of frame format. Legacy STAs treat the MU-RTS as for other STAs and can correctly update their NAV. The use of compressed RA field of MU-RTS allows one MAC address field to hold up to 4 receiver addresses, dramatically reduced the frame size.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters, receivers, transceivers in wireless networks, etc. Further, embodiments of the invention can take the form of an entirely hardware embodiment, an entirely software embodiment or an embodiment containing both hardware and software elements.

Figure 10:
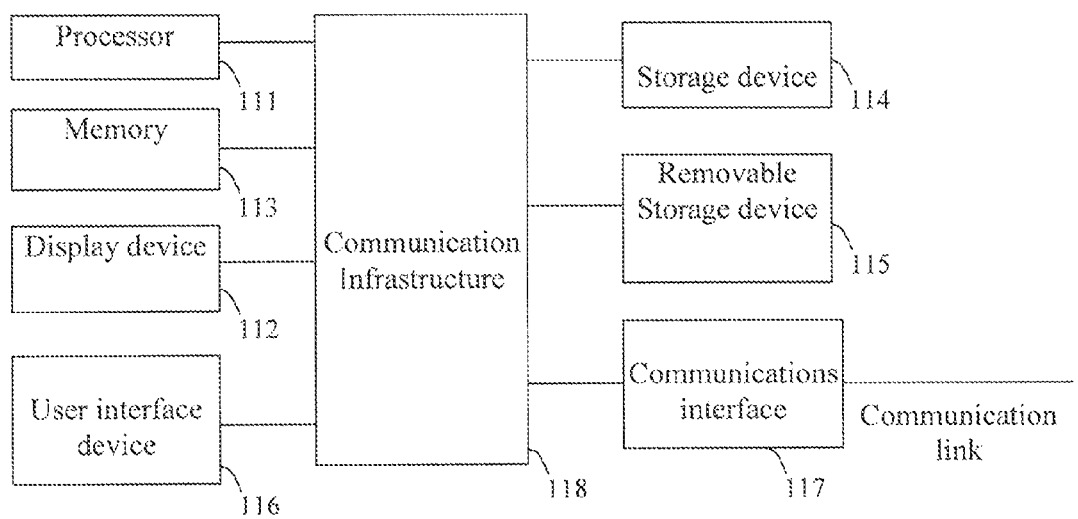
FIG. 10 is a high level block diagram showing an information processing system comprising a computer system useful for implementing an embodiment of the invention.

FIG. 10 is a high level block diagram showing an information processing system comprising a computer system 100 useful for implementing an embodiment of the present invention. The computer system 100 includes one or more processors 111, and can further include an electronic display device 112 (for displaying graphics, text, and other data), a main memory 113 (e.g., random access memory (RAM)), storage device 114 (e.g., hard disk drive), removable storage device 115 (e.g., removable storage drive, removable memory module, a magnetic tape drive, optical disk drive, computer readable medium having stored therein computer software and/or data), user interface device 116 (e.g., keyboard, touch screen, keypad, pointing device), and a communication interface 117 (e.g., modem, a network interface (such as an Ethernet card), a communications port, or a PCMCIA slot and card). The communication interface 117 allows software and data to be transferred between the computer system and external devices. The system 100 further includes a communications infrastructure 118 (e.g., a communications bus, cross-over bar, or network) to which the aforementioned devices/modules 11 through 17 are connected.

Information transferred via communications interface 117 may be in the form of signals such as electronic, electromagnetic, optical, or other signals capable of being received by communications interface 117, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments of the present invention have been described with reference to flowchart illustrations and/or block diagrams of methods, apparatus (systems) and computer program products according to embodiments of the invention. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing embodiments of the present invention. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer programs (i.e., computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor and/or multi-core processor to perform the features of the computer system. Such computer programs represent controllers of the computer system.

Though the present invention has been described with reference to certain versions thereof; however, other versions are possible. Therefore, the spirit and scope of the appended claims should not be limited to the description of the preferred versions contained herein.

What is claimed is:

1. A method of wireless communication, comprising:
reserving a transmission period for simultaneously transmitting data to multiple intended receiving wireless stations on multiple downlink spatial streams over a wireless communication medium;
wherein reserving the transmission period comprises:
generating a multi-user request-to-send (MU-RTS) frame including:
a receiver address (RA) field that comprises a compressed RA field, wherein the compressed RA field comprises compressed addresses for the multiple receiving stations;
an indication field that indicates the RTS frame as an MU-RTS without altering the RTS frame type/subtype; and
transmitting the MU-RTS frame to the multiple receiving stations,
wherein the compressed RA field comprises:
compatibility information for differentiating compressed addresses from any actual address in the wireless network, and a bit, wherein first setting of bit representing information that indicates that the compressed RA field represents an individual receiver station address, and second setting of the bit representing information that indicates that the compressed RA field represents compressed addresses for multiple receiver station addresses.

2. The method of claim 1, wherein:
a wireless transmitter station comprises a wireless access point (AP) station that transmits the data to the multiple intended receiving wireless stations;
each compressed address in the compressed RA field comprises an Association ID (AID) for each receiver station assigned by the AP station; and
the order of the AIDs presented in the compressed RA field indicates order of transmission of clear-to-send (CTS) frames from intended receiving stations back to the AP station over the wireless communication medium.

3. The method of claim 2, wherein:
the compressed RA field comprises six Octets capable of representing at least four AID values corresponding to at least four receiver stations, wherein the bit is bit 0 of Octet 0;
bit 1 of Octet 0 indicates whether the compressed RA field represents a universally administered address or a locally administered address;
the compatibility information comprises bits 2-3 of Octet 1 comprise Compatibility Bits (CB) configured to ensure that the compressed addresses do not equal any actual addresses in a wireless network; and
each AID comprises 11 bits, such that an AID field is set to 0 if it is not used to indicate any receiver station address, wherein the order of the AIDs presented in the compressed RA field indicates order of transmission of CTS frames from intended receiving stations back to the AP station over the wireless medium.

4. The method of claim 1, wherein:
a wireless transmitter station comprises a wireless access point (AP) station that transmits the data to the multiple intended receiving wireless stations;
each compressed address in the compressed RA field comprises a partial Association ID (P_AID) for each receiver station assigned by the AP station; and
the order of the P_AIDs presented in the compressed RA field indicates order of transmission of clear-to-send (CTS) frames from intended receiving stations back to the AP station over the wireless communication medium.

5. The method of claim 4, wherein:
the compressed RA field comprises six Octets capable of representing at least four AID values corresponding to at least four receiver stations, wherein the bit is bit 0 of the Octet;
bit 1 of Octet 0 indicates whether the compressed RA field represents a universally administered address or a locally administered address;
the compatibility information includes bits 2-3 of Octet 1 that comprise Compatibility Bits (CB) configured to ensure that the compressed addresses do not equal any actual addresses in a wireless network; and each P_AID comprises 9 bits, such that a P_AID field is set to 0 if it is not used to indicate any receiver station address, wherein the order of the AIDs presented in the compressed RA field indicates order of transmission of CTS frames from intended receiving stations back to the AP station over the wireless medium.

6. The method of claim 5, wherein: a P_AID includes 9 LSBs of an 11-bit AID.

7. The method of claim 1, wherein: the indication field comprises a reused bit in the frame control field of a MAC header of the MU-RTS frame.

8. The method of claim 1, wherein: the indication field comprises reserved bits in the VHT Service field of the MU-RTS frame.

9. The method of claim 1, wherein:
the indication field comprises a reserved bit in the VHT L-SIG field of the preamble of the MU-RTS flame.

10. The method of claim 1, wherein:
the indication field comprises a reserved bit in the VHT-SIG-A fields of the preamble of the MU-RTS flame.

11. The method of claim 2, further comprising:
the AP station specifying an inter-frame spacing period for responsive CTS flames from the receiver stations to the AP station in relation to the RTS frame.

12. The method of claim 11, wherein the inter-flame spacing period between said RTS flame and the first CTS flame which is of SIFS in length.

13. The method of claim 2, further comprising:
the AP station specifying an inter-frame spacing period between multiple responsive CTS frames from the receiver stations to the AP station in relation to the RTS flame.

14. The method of claim 1, wherein the transmitting station comprises a multiple-input-multiple-output (MIMO) wireless station.

15. The method of claim 1, wherein the wireless network comprises a wireless local area network (WLAN).

16. The method of claim 1, wherein during a downlink phase, a MU-RTS is transmitted from a transmitting wireless station to the intended receiving wireless stations, and during a corresponding uplink phase, a response CTS is transmitted from each of the intended receiving wireless stations to the transmitting wireless station.

17. A wireless station for wireless communication in a wireless network, comprising:
a communication physical layer configured for wireless communication over a wireless communication module; and
a channel access module configured for reserving a transmission period for simultaneously transmitting data from a transmitting wireless station to multiple intended receiving wireless stations on multiple downlink spatial streams over a wireless communication medium, wherein reserving the transmission period comprises generating a multi-user request-to-send (MU-RTS) frame including a receiver address (RA) field that comprises a compressed RA field,
wherein the compressed RA field comprises compressed addresses for the multiple intended receiving wireless stations in the wireless network, and an indication field that indicates the RTS frame as an MU-RTS without altering the RTS frame type/subtype, and transmission of the MU-RTS frame to the multiple intended receiving wireless stations, wherein the compressed RA field comprises:
compatibility information for differentiating compressed addresses from any actual address in the wireless network, and a bit, wherein first setting of bit representing information that indicates that the compressed RA field represents an individual receiver station address, and second setting of the bit representing information that indicates that the compressed RA field represents compressed addresses for multiple receiver station addresses.

18. The wireless station of claim 17, wherein:
each compressed address in the compressed RA field comprises an Association ID (AID) for each receiving wireless station assigned by an AP station; and the order of the AIDs presented in the compressed RA field indicates order of transmission of clear-to-send (CTS) frames from intended receiving wireless stations back to the AP station over the wireless communication medium.

19. The wireless station of claim 17, wherein:
a receiving wireless station utilizes the indication field to differentiate the RTS frame from the MU-RTS frame.

20. The wireless station of claim 17, wherein:
each compressed address in the compressed RA field comprises a partial Association ID (P_AID) for each wireless receiver station assigned by the AP station; and the order of the P_AIDs presented in the compressed RA field indicates order of transmission of clear-to-send (CTS) frames from intended receiving wireless stations back to the AP station over the wireless communication medium.

21. The wireless station of claim 17, wherein:
the indication field comprises a reused bit in the frame control field of a MAC header of the MU-RTS frame.

22. The wireless station of claim 17, wherein:
the indication field comprises reserved bits in the VHT Service field of the MU-RTS frame.

23. The wireless station of claim 17, wherein:
the indication field comprises a reserved bit in the VHT L-SIG field of the preamble of the MU-RTS frame.

24. The wireless station of claim 17, wherein:
the indication field comprises a reserved bit in the VHT-SIG-A fields of the preamble of the MU-RTS frame.

25. The wireless station of claim 17, wherein:
an inter-frame spacing period is for responsive CTS frames from the wireless receiver stations to the wireless station in relation to the RTS frame.

26. The wireless station of claim 25, wherein:
the inter-frame spacing period between said RTS frame and the first CTS frame which is of SIFS in length.

27. The wireless station of claim 17, wherein:
an inter-frame spacing period is between multiple responsive CTS frames from the wireless receiver stations to the wireless station in relation to the RTS frame.

28. The wireless station of claim 17, wherein the transmitting wireless station comprises a multiple-input-multiple-output (MIMO) wireless station.

29. The wireless station of claim 17, wherein the wireless network comprises a wireless local area network (WLAN).

30. The method of claim 1, wherein the compressed RA field comprises a plurality of Octets capable of representing at least four Association ID (AID) values corresponding to at least four wireless receiver stations.

31. The method of claim 1, wherein at least one Octet indicates whether the compressed RA field represents a universally administered address or a locally administered address.

32. The method of claim 1, wherein the compatibility information comprises Compatibility Bits (CB) configured to ensure that the compressed addresses do not equal any actual addresses in a wireless network.

33. A method of wireless communication, comprising:
reserving a transmission period for simultaneously transmitting data to multiple intended receiving wireless stations on multiple downlink spatial streams over a wireless communication medium;
wherein reserving the transmission period comprises:
generating a multi-user request-to-send (MU-RTS) frame including:
a receiver address (RA) field that comprises a compressed RA field, wherein the compressed RA field comprises compressed addresses for the multiple receiving stations;
an indication field that indicates the RTS frame as an MU-RTS without altering the RTS frame type/subtype;
transmitting the MU-RTS frame to the multiple receiving stations,
wherein the compressed RA field comprises:
compatibility information for differentiating compressed addresses from any actual addresses in the wireless network, and a bit, wherein first setting of bit representing information that indicates that the compressed RA field represents an individual receiver station address, and second setting of the bit representing information that indicates that the compressed RA field represents compressed addresses for multiple receiver station addresses;
and
utilizing the indication field by a receiving wireless station to differentiate the RTS frame from the MU-RTS frame.

* * * * *